(12) United States Patent
Liao

(10) Patent No.: US 9,262,799 B2
(45) Date of Patent: Feb. 16, 2016

(54) SHARED MEMORY EIGENSOLVER

(71) Applicant: Silicon Graphics International Corp., Milpitas, CA (US)

(72) Inventor: Cheng Liao, Pleasanton, CA (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

(21) Appl. No.: 14/536,477

(22) Filed: Nov. 7, 2014

(65) Prior Publication Data

US 2015/0130825 A1    May 14, 2015

Related U.S. Application Data

(60) Provisional application No. 61/901,731, filed on Nov. 8, 2013.

(51) Int. Cl.
| | | |
|---|---|---|
| G06F 15/80 | (2006.01) | |
| G06F 15/16 | (2006.01) | |
| G06T 1/60 | (2006.01) | |
| G06F 17/16 | (2006.01) | |
| G06F 12/08 | (2006.01) | |
| G06F 9/54 | (2006.01) | |

(52) U.S. Cl.
CPC . *G06T 1/60* (2013.01); *G06F 9/544* (2013.01); *G06F 12/08* (2013.01); *G06F 17/16* (2013.01); *G06F 2212/2542* (2013.01)

(58) Field of Classification Search
None
See application file for complete search history.

(56) References Cited

U.S. PATENT DOCUMENTS

| | | | | |
|---|---|---|---|---|
| 2006/0077091 A1* | 4/2006 | Wu | ......... | G01S 13/88 342/25 C |
| 2012/0139926 A1* | 6/2012 | Clohset | ......... | G06T 15/005 345/502 |

OTHER PUBLICATIONS

Ballard et al., "Communication Avoiding Symmetric Band Reduction," Principles and Practice of Parallel Programming, 10 pages (Feb. 25, 2012).
Bischof et al., "The SBR Toolbox—Software for Successive Band Reduction," ACM Transactions on Mathematical Software, 16 pages (1996).
Haidar et al., "Parallel Reduction to Condensed Forms for Symmetric Eigenvalue Problems using Aggregated Fine-Grained and Memory-Aware Kernels," International Conference for High Performance Computing, Networking, Storage and Analysis, 11 pages (Nov. 14, 2011).
Ltaief et al., "Solving the Generalized Symmetric Eigenvalue Problem using Tile Algorithms on Multicore Architectures," Advances in Parallel Computing, vol. 22, pp. 397-404 (2012).
Luszczek et al., "Two-Stage Tridiagonal Reduction for Dense Symmetric Matrices using Tile Algorithms on Multicore Architectures," International Parallel & Distributed Processing Symposium, 14 pages (May 16, 2011).
Petschow et al., "MR3-SMP: A Symmetric Tridiagonal Eigensolver for Multi-core Architectures," Parallel Computing, vol. 37, pp. 795-805 (Dec. 2011).

(Continued)

*Primary Examiner* — Jacinta M Crawford
(74) *Attorney, Agent, or Firm* — Sunstein Kann Murphy & Timbers LLP

(57) ABSTRACT

A method for computing eigenvectors and eigenvalues of a square matrix in a high performance computer involves dynamically reallocating the computer's computing cores for various phases of the computation process.

9 Claims, 18 Drawing Sheets

(56) References Cited

OTHER PUBLICATIONS

Ribeiro et al., "Memory Access Characterization of OpenMP Workloads on a Multi-core NUMA Machine," Institut National de Recherche en Informatique et en Automatique, 29 pages (Jun. 2010).

Univ. of Tennessee "Plasma Readme," icl.cs.utk.edu/projectsfiles/plasma/html/README.html, 7 pages (Jul. 4, 2013).

International Searching Authority International Search Report—International Application No. PCT/US2014/064688, dated Apr. 8, 2015, together with the Written Opinion of the International Searching Authority, 12 pages.

\* cited by examiner

Algorithm 1 Tile Band TRD Algorithm with Householder Reflectors.

```
 1: for step = 1, 2 to NT-1 do
 2:     DGEQRT(A_{step+1,step})
 3:     {Left Updates}
 4:     DLARFB(A_{step+1,step}, A_{step+1,step+1})
 5:     for i = step + 1 to NT do
 6:        {Right Updates}
 7:        DLARFB(A_{step+1,step}, A_{i,step+1})
 8:     end for
 9:     for k = step + 2 to NT do
10:        DTSQRT(A_{step+1,step}, A_{k,step})
11:        {Left Updates}
12:        for j = step + 1 to k do
13:           if ( j == step + 1) then
14:              DSSRFB(A_{step+1,j}, A_{k,j}, A tmp1)
15:           else if ( j == k ) then
16:              DSSRFBLR(A tmp1, A_{k,j}, A tmp2)
17:           else
18:              DSSRFBLRT(A_{j,step+1}, A_{k,j})
19:           end if
20:        end for
21:        {Right Updates}
22:        for m = step + 1 to NT do
23:           if (m == step + 1) then
24:              DSSRFB(A tmp2, A tmp3, A_{k,m})
25:           else if (m == k) then
26:              DSSRFBLR(A tmp3, A_{k,m})
27:           else if (m > k) then
28:              DSSRFBLRT(A_{m,step+1}, A_{k,m})
29:           end if
30:        end for
31:     end for
32: end for
```

---

Algorithm 2 Standard Bulge Chasing Algorithm of $b$ extra diagonals.

---

1: for $k = 1, 2$ to $N-2$ do
2:     {Column annihilation}
3:     DGEQR2($B_{k+1:k+min\,(b,n-k),k}$)
4:     {Left and right updates on a diagonal block}
5:     DSYRF($B_{k+1:k+min\,(b,n-k),\,k+2:k+min\,(b,n-k)}$)
6:     {Chasing the bulge}
7:     for $i = k + 1$ to N with $i\ =\ + b$ do
8:         if $i + b == n$ then
9:             {Right update for clean-up}
10:             DLARFX($B_{min\,(i+b,n),\ i:min\,(i+b,n)-1}$)
11:         end if
12:         if $min\,(i+b,n) < (n-1)\ ||\ min\,(i+2*b,n) < (n-1)$ then
13:             {Column annihilation within the sweep}
14:             DGEQR3($B_{min\,(i+b,n):min\,(i+2*b,n)-1,\,min\,(i+b,n):min\,(i+2*b,n)-1}$)
15:             {Left and right updates on a diagonal block}
16:             DSYRF($B_{min\,(i+b,n):min\,(i+2*b,n)-1,\,min\,(i+b,n):min\,(i+2*b,n)-1}$)
17:         end if
18:     end for
19: end for

| Tile 01 1501 | Tile 02 1502 | Tile 03 1503 | Tile 04 1504 | Tile 05 1505 |
|---|---|---|---|---|
| Tile 06 1506 | Tile 07 1507 | Tile 08 1508 | Tile 09 1509 | Tile 10 1510 |
| Tile 11 1511 | Tile 12 1512 | Tile 13 1513 | Tile 14 1514 | Tile 15 1515 |
| Tile 16 1516 | Tile 17 1517 | Tile 18 1518 | Tile 19 1519 | Tile 20 1520 |
| Tile 21 1521 | Tile 22 1522 | Tile 23 1523 | Tile 24 1524 | Tile 25 1525 |

1500

1600

1420   1420   1420   1420   1420

1800

| Partition<br>1801 | Node Allocation<br>1802 | Segmentation<br>1803 |
|---|---|---|
| Memory<br>1804 | Node Configuration<br>1805 | Band Reduction<br>1806 |
| Tridiagonal<br>1807 | Tridiagonal Eigensolution<br>1808 | Band Eigenvector<br>1809 |
| Square Eigenvector<br>1810 | User Interface<br>1811 | |

*FIG. 18*

SHARED MEMORY EIGENSOLVER

CROSS-REFERENCE TO RELATED APPLICATIONS

The present application claims priority from U.S. provisional application Ser. No. 61/901,731, titled "Shared Memory Eigensolver," filed Nov. 8, 2013. The foregoing application is hereby incorporated herein by reference in its entirety.

TECHNICAL FIELD

The invention generally relates to a non-uniform memory access (NUMA) computer system and, more particularly, the invention relates to computing eigenvalues and eigenvectors of a very large matrix in a NUMA computer system.

BACKGROUND ART

Some data modeling applications use matrices that describe transformations of physical parameters. For example, a cosmological model of a galaxy might use a matrix to describe the motion of stars in space, and a finite element model of a material may use a matrix to model stresses in a material at a number of different locations. These matrices transform initial property vectors of the model into final property vectors by standard matrix multiplication.

For any transformation by matrix multiplication, there may be certain vectors for which the transformation merely acts to lengthen or shorten the vector; these vectors are called "eigenvectors" of the transformation. Eigenvectors provide "preferred directions"; vectors parallel to eigenvectors are not rotated by the transformation. The corresponding scaling factor of the lengthening or shortening for a given direction is called the "eigenvalue" for the eigenvector. Different eigenvectors may have different corresponding eigenvalues, and eigenvectors with an eigenvalue of 1 are not lengthened or shortened by the transformation; for these vectors, the transformation preserves length. Eigenvectors and eigenvalues provide a useful mathematical tool to analyze matrix transformations. Therefore, it is desirable to be able to compute eigenvectors and eigenvalues (collectively, "eigenpairs") for any given matrix.

Several techniques are known to calculate eigenpairs of a matrix. One family of "eigensolver" techniques first reduces the matrix to a tridiagonal form; that is, a form in which the main diagonal of the matrix, and the diagonals just above and below it, may contain non-zero numbers, but all other entries are zero. Such an eigensolver computes the eigenpairs of the tridiagonal matrix, then convert the computed eigenvectors back to the original reference system.

In order to achieve the best scalability on many processors, the ACM TOMS 807 algorithm, or successive band reduction ("SBR"), is often employed for the tridiagonal reduction phase. In SBR, the initial, densely-populated matrix is reduced to a multiple band intermediate form having many non-zero diagonals in a first stage, and later reduced from the multiple band form to the tridiagonal (three band) form in the second stage. Accordingly, after calculating the eigenpairs in a third stage, the eigenvector back-transformation also requires two stages, i.e. from the tridiagonal to the multiple band reference system in stage four, then to the original dense reference system in stage five. The multistage SBR approach allows highly scalable BLAS-3 computing kernels to be used, but the two stage eigenvector back-transformation introduces additional floating point operations that influence scalability.

The Parallel Linear Algebra Software for Multicore Architectures, or "PLASMA", is publically available free software from the University of Tennessee, Knoxville, and is the state of art mathematical library for performing conversion of a dense symmetric array to and from tridiagonal form on shared memory systems with multi-core processors, such as the system shown in FIGS. 1-3 and described below. At the heart of the PLASMA implementation is a tiled storage of the data arrays and a DAG (directed acyclic graph) scheduling of the computational subtasks. PLASMA is an improvement over the older LAPACK and ScaLAPACK libraries in terms of memory usage pressure, process synchronization requirements, task granularity, and load balance, and often results in much better performance and scalability for sufficiently large problems. In particular, LAPACK and ScaLAPACK do not employ SBR calculations. Also, LAPACK is not designed for scalability, and the ScaLAPACK library communicates using message passing, which is more difficult to program and debug.

SUMMARY OF THE EMBODIMENTS

The state of the art eigensolver PLASMA suffers from a number of shortcomings that only become apparent when it is tasked to solve very large problems. Various embodiments of the invention identify and solve these shortcomings. First, PLASMA is limited to 32-bit architectures. Because matrix entries are addressed using 32-bit signed integers, the largest matrix on which PLASMA may operate has a dimension N limited to the square root of the largest 32-bit signed integer; that is, $N=\text{sqrt}(2^{31})=46340$. This value of N is too low to operate on matrices that have hundreds of thousands or millions of rows and columns, as is required by state of the art computations. Second, because PLASMA is limited to such small matrices, it does not use a tridiagonal eigenpair solver that scales effectively for larger matrices. While such algorithms exist, such as the multiple relatively robust representations ("MRRR") algorithm that is publicly available in the MR3SMP package, PLASMA is not designed to use them. Third, PLASMA operates on a fixed pool of threads. This is a disadvantage because different subtasks that occur in the five stages of the eigensolver may occur in parallel and have different computational complexities, so a static thread allocation for all five stages is inefficient.

Thus, various embodiments of the invention provide methods and shared memory systems for using a combination of the SBR and MRRR techniques to calculate eigenpairs for dense matrices having very large numbers of rows and columns. Such embodiments are not merely "scaled up" versions of PLASMA, because they address scalability requirements that were not contemplated in the design of PLASMA. In particular, PLASMA does not use a highly scalable tridiagonal eigensolver. Moreover, PLASMA is not adapted to allocate a different number of threads to each of the different computational stages of the eigensolver.

A first embodiment is a computerized method for computing eigenvectors of a large square matrix in a high performance computing (HPC) system having a plurality of nodes, each node including one or more processing cores for executing program threads, the nodes having non-uniform memory access. The method includes allocating the computing resources of the high performance computing system into a plurality of partitions, each partition including memory and a plurality of computer processor cores; allocating the computing resources of the one of the plurality of partitions into a plurality of partition nodes, each partition node including associated node memory and a plurality of the computer processor cores; segmenting the large square matrix of data into a plurality of digestible sub-matrices; and storing the plurality of sub-matrices in a partition memory, which partition memory is accessible by each node, such that all of the sub-matrices are accessible by each of the nodes, the partition memory including the plurality of node memories. Then, in a first phase, the method involve reducing the square matrix to band form by instantiating an instance of band reduction software on one of the plurality of partition nodes, the band reduction software employing a user-specified first number of threads for executing first phase matrix operations on the sub-matrices; instantiating additional instances of band reduction software on additional partition nodes; dedicating, within each of the partition nodes, one of the plurality of cores to a corresponding one of the plurality of threads; creating a band matrix from the square matrix by performing matrix operations on the sub-matrices using the band reduction software, each of the threads accessing the sub-matrices from the partition memory, such that each node executes its corresponding instance of the computer software in an SMP mode; storing the band matrix in band-matrix segments in the partition memory; and terminating the instances of the band reduction software.

In a second phase, the method includes reducing the band matrix to tridiagonal form by instantiating an instance of tridiagonal reduction software on one of the plurality of nodes, the tridiagonal reduction software employing a second number of user-specified second phase threads for executing second phase matrix operations on the band matrix creating a tridiagonal matrix by performing matrix operations on the band-matrix using the tridiagonal reduction software, each of the second phase threads accessing the band-matrix from the partition memory storing the tridiagonal matrix in the partition memory; and terminating the instances of tridiagonal reduction software.

In a third phase, the method includes computing eigenvectors and eigenvalues of the tridiagonal matrix by instantiating an instance of tridiagonal eigensolution software on a partition node, the tridiagonal eigensolution software employing a third number of user-specified third phase threads for executing third phase matrix operations on the tridiagonal matrix; determining the eigenvectors and eigenvalues of the tridiagonal matrix by performing matrix operations on the tridiagonal matrix using the tridiagonal eigensolution software; storing the eigenvectors and eigenvalues of the tridiagonal matrix in the partition memory; and terminating the instances of the tridiagonal eigensolution software.

Then, in a fourth phase, the method includes transforming the eigenvectors of the tridiagonal matrix to eigenvectors of the band matrix (e.g., express the eigenvectors of the tridiagonal matrix with reference to the band matrix) by instantiating an instance of band backtransform software on one of the plurality of partition nodes, the band backtransform software employing a fourth number of user-specified fourth phase threads for executing fourth phase matrix operations on the eigenvectors and eigenvalues of the tridiagonal matrix; transforming the eigenvectors of the tridiagonal matrix to eigenvectors of the band matrix by performing matrix operations on the eigenvectors of the tridiagonal matrix using the band backtransform software; storing the eigenvectors of the band matrix in the partition memory; and terminating the instances of the band backtransform software.

Then, in a fifth phase, the method includes transforming the eigenvectors of the band matrix to eigenvectors of the square matrix (e.g., express the eigenvectors of the band matrix with reference to the square matrix) by instantiating an instance of dense backtransform software on one of the partition nodes, the dense backtransform software employing a fifth number of user-specified fifth phase threads for executing fifth phase matrix operations on the eigenvectors of the band matrix; instantiating additional instances of the dense backtransform software on the partition nodes; dedicating, within each of partition nodes, one of the plurality of cores to a corresponding one of the plurality of fifth phase threads; transforming eigenvectors of the band matrix to eigenvectors of a square matrix by performing matrix operations on the eigenvectors of the band matrix using the dense backtransform software, each of the fifth phase threads accessing the eigenvectors of the band matrix from the partition memory, such that each node executes its corresponding instance of the dense backtransform software in an SMP mode; storing the eigenvectors of the square matrix in the partition memory; and terminating the instances of the dense backtransform software.

In some embodiments, the step of storing the plurality of sub-matrices in a partition includes storing the plurality of sub-matrices in an interleaved configuration. In some embodiments, the band reduction software includes PLASMA. In some embodiments, the tridiagonal eigensolution software includes the MR3SMP package.

Other embodiments include a non-transient computer readable medium storing executable code configured to execute on an HPC, the code comprising code for causing the HPC to perform the method steps described herein.

Some embodiments include a system having modules for performing the steps of the foraging methods. For example, a system may include a user interface configured to receive input from a user; a segmentation module configured to segment a square matrix into a plurality of tiles; a memory module configured to store the plurality of tiles; a node configuration module configured to allocate cores to threads, to allocate the cores into a plurality of configurations corresponding to a plurality of phases of a process for computing the eigenvectors, the plurality of configurations including: a band reduction module configured to reduce the square matrix to a band matrix by operating on the tiles; a tridiagonal module configured to transform the band matrix to a tridiagonal matrix; a tridiagonal eigenvector module configured to determine eigenvectors of the tridiagonal matrix; a band eigenvector module configured to transform the eigenvectors of the tridiagonal matrix to eigenvectors of the band matrix; and a dense eigenvector module configured to transform the eigenvectors of the band matrix to eigenvectors of the square matrix.

In some embodiments, the user interface may be a remote computer. In some embodiments, each node includes node memory that collectively form that memory module. In some embodiments, the memory module includes interleaved memory.

BRIEF DESCRIPTION OF THE DRAWINGS

The foregoing features of embodiments will be more readily understood by reference to the following detailed description, taken with reference to the accompanying drawings, in which:

FIG. 5 is an algorithm listing of the first process shown in FIG. 4.

FIG. 6 is an algorithm listing of the second process shown in FIG. 4.

FIG. 18 schematically illustrates modules of a system for of computing eigenvectors and eigenvalues of a square matrix.

DETAILED DESCRIPTION OF SPECIFIC EMBODIMENTS

Figure 1:
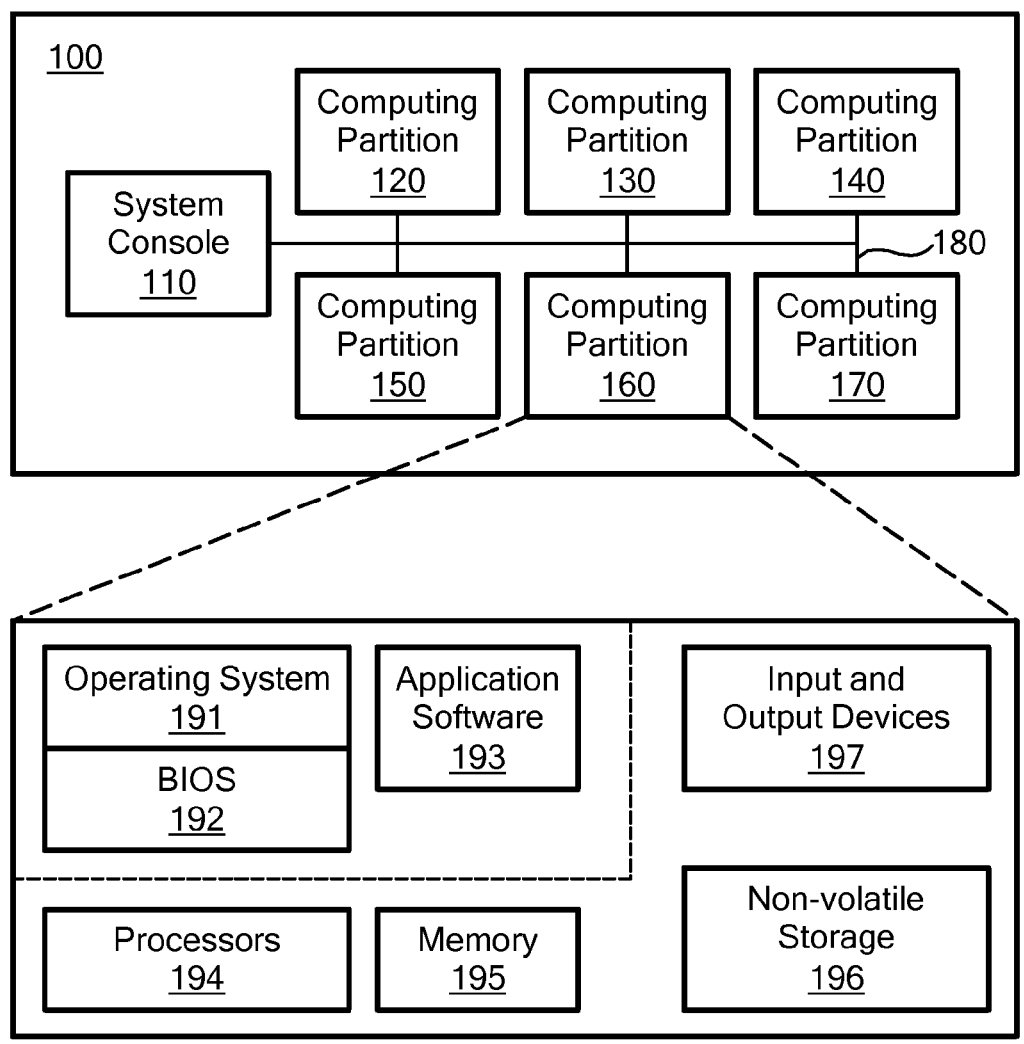
FIG. 1 schematically shows a logical view of an HPC system in accordance with one embodiment of the present invention.

Various embodiments improve the functionality of a high-performance computer, in the process of computing eigenvectors and eigenvalues of a square matrix, by reallocating computer resources at various phases of a process. A given piece of software may be able to perform some or all of the matrix operations necessary to compute the eigenvectors and eigenvalues of a square matrix of limited size, but may not be scalable to perform those operations on a larger matrix. To work around this limitation, various embodiments store the matrix data in a common memory accessible to each a plurality of cores in a plurality of nodes, and provide access to the data in the common memory to multiple instances of the software. Each instance of the software runs on a corresponding core within one of nodes, and each of the nodes may run one or more slave instances of the software on its remaining cores. In short, various embodiments include two levels of SMP operation: a first level over a plurality of independent nodes, and second level within each of the plurality of nodes. Although there are other known ways of computing eigenvectors and eigenvalues of a square matrix on an HPC, various embodiments improve the operation of the HPC.

DEFINITIONS

As used in this description and the accompanying claims, the following terms shall have the meanings indicated, unless the context otherwise requires:

A "large matrix" is a matrix of a dimension that is too large to be processed by a single instance of matrix operation software. For example, a matrix of dimension greater than $2^{16}$ is too large to be processed by a single instance of PLASMA (e.g., on a single node), as described further below.

A "digestible matrix" is a sub-matrix of a large matrix, and has dimensions that are small enough to be processed by a single instance of matrix operation software. For example, a matrix of dimension less than $2^{16}$ is of a size that may be processed by a single instance of PLASMA, as described further below.

An "instance" of software is an execution of a computer program that involves accessing memory on one or more nodes and performing machine instructions such as floating point multiplication and addition on the accessed memory by one or more processing cores to complete a high level task.

To "terminate" an instance of software means to shut down the infrastructure that is used to perform a software instance. The infrastructure may include, but is not limit to, a pool of memory and a pool of processing threads on one or more nodes.

The term "SMP" (or "symmetric multiprocessing") in connection with a computer process means two or more computer processors share common resources including memory, I/O devices, interrupt system, etc., and execute the same or different program, and work on the same or different data, to solve a common high level task.

The term "band reduction software" means software configured to reduce a dense matrix to a band matrix, including for example software described below.

The term "tridiagonal reduction software" means software configured to reduce a band matrix to a tridiagonal matrix, including for example software described below.

The term "tridiagonal eigensolution software" means software configured to determine the eigenvalues and/or eigenvectors of a tridiagonal matrix, including for example software described below.

The term "band backtransform software" means software configured to determine the eigenvectors of a band matrix from eigenvalues of a tridiagonal matrix, including for example software described below.

The term "dense backtransform software" means software configured to determine the eigenvectors of a dense matrix from eigenvalues of a band matrix, including for example software described below.

Overview of System Architecture

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network cards, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Washington, or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
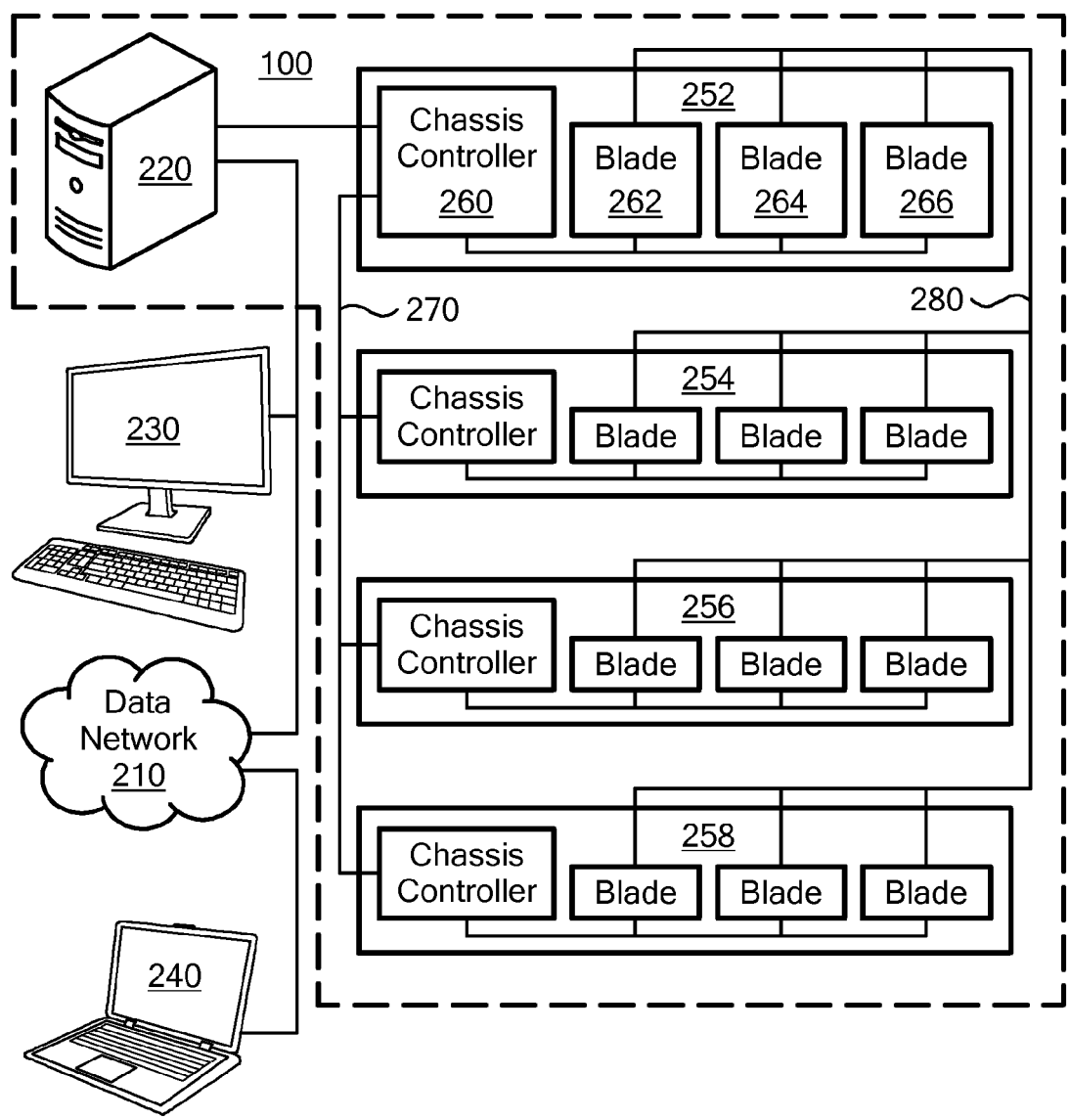
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to an enterprise data network 210 to facilitate user access.

The HPC system 100 includes a system management node ("SMN") 220 that performs the functions of the system console 110. The management node 220 may be implemented as a desktop computer, a server computer, or other similar computing device, provided either by the enterprise or the HPC system designer, and includes software necessary to control the HPC system 100 (i.e., the system console software).

The HPC system 100 is accessible using the data network 210, which may include any data network known in the art, such as an enterprise local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by an enterprise computer 230 by way of remote login using tools known in the art such as Windows® Remote Desktop Services or the Unix secure shell. If the enterprise is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or an enterprise computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, the computing hardware of its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
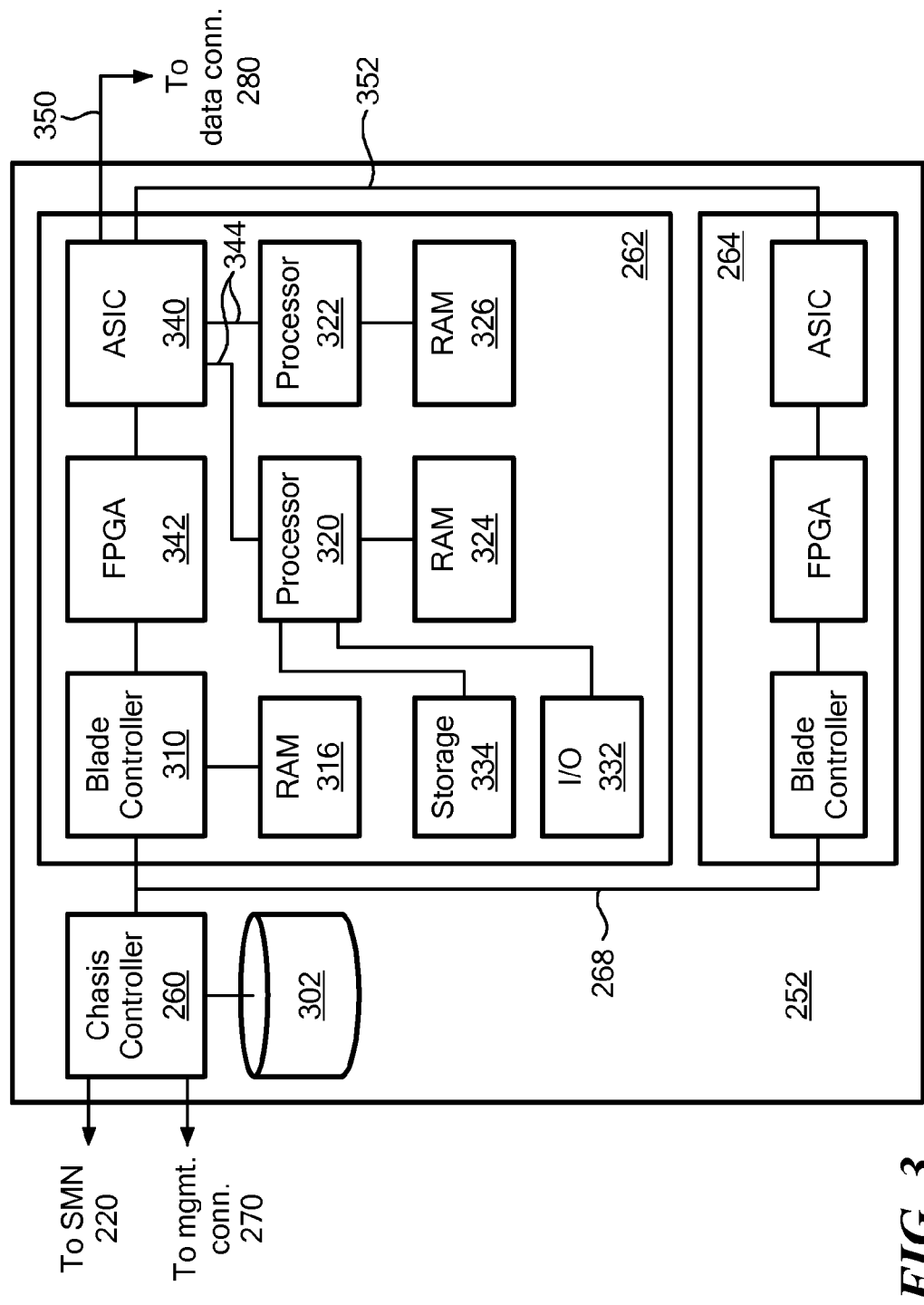
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to some devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

Overview of System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, an enterprise may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A processor 320 or 322 inside a blade may be referred to as a "computing node" or simply a "node" to emphasize its allocation to a particular partition. It will be understood that a physical blade may comprise more than one computing node if it has multiple processors 320, 322 and memory 324, 326.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Scalable Eigensolver

Figure 4:
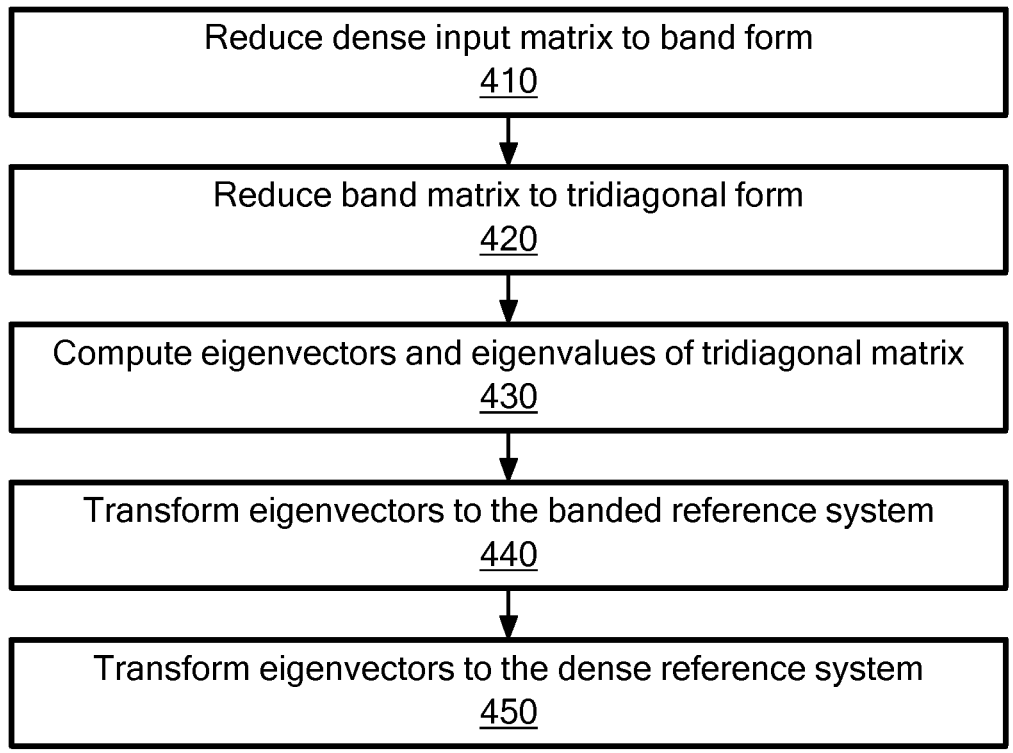
FIG. 4 is a flowchart that shows five processes executed by a scalable eigensolver in an HPC system according to an embodiment of the invention.

FIG. 4 is a flowchart that shows five processes executed by a scalable eigensolver in an HPC system 100. The flowchart begins with a square input matrix for which a user desires to calculate eigenvectors and eigenvalues (collectively, eigenpairs). Typically, the matrix is dense, rather than sparse. "Dense" matrices are those matrices whose entries are primarily non-zero. Dense matrices typically require more computational resources to operate on, so these matrices are converted into band matrices and tridiagonal matrices as described herein.

In a first process 410, the dense input matrix is reduced to a band matrix. A "band matrix" is a sparse matrix whose non-zero entries are confined to diagonal bands that include the main diagonal and a number of diagonals on either side of (that is, above or below) the main diagonal. The total number of such bands is called the matrix "bandwidth." A purely diagonal matrix has a bandwidth of one; that is, all non-zero entries are confined to a single band along the main diagonal. A tridiagonal matrix has a bandwidth of three. However, the process 410 does not convert the input matrix to a tridiagonal matrix, but rather converts it to a matrix having a larger bandwidth than three. The algorithm 5410 used in process 410 of an illustrated embodiment of the invention is shown in FIG. 5.

In a second process 420, the band matrix is further reduced to a tridiagonal form. Such tridiagonal matrices lend themselves to various computational shortcuts that are not present in matrices having larger bandwidths. The algorithm 6420 used in process 420 of an illustrated embodiment is shown in FIG. 6. Processes 410 and 420 cooperate to reduce the dense input matrix to a tridiagonal matrix.

Process 410 operates by performing successive band reduction ("SBR"), while process 420 operates by performing Householder reflections. Both techniques are known in the art; however a key difference between them is that the SBR computation comprises mostly matrix-matrix multiplications, while the Householder computation primarily comprises matrix-vector multiplications. Matrix-matrix multiplications permit greater economies of scale when operating on an HPC system 100, because they permit higher data reuse. To be specific, in a matrix-matrix multiplication, each entry of the first matrix is multiplied by a collection of entries of the second matrix; that is, each entry is used multiple times. This multiple use permits so-called block or tile matrix multiplication, which is very efficient on an HPC system 100. However, in a matrix-vector multiplication, each entry of the matrix is multiplied by only a single entry of the vector. Therefore, the matrix-matrix operations of SBR in process 410 are better suited to data localization in an HPC system 100 than the matrix-vector operations of Householder reflections in process 420.

Figure 8:
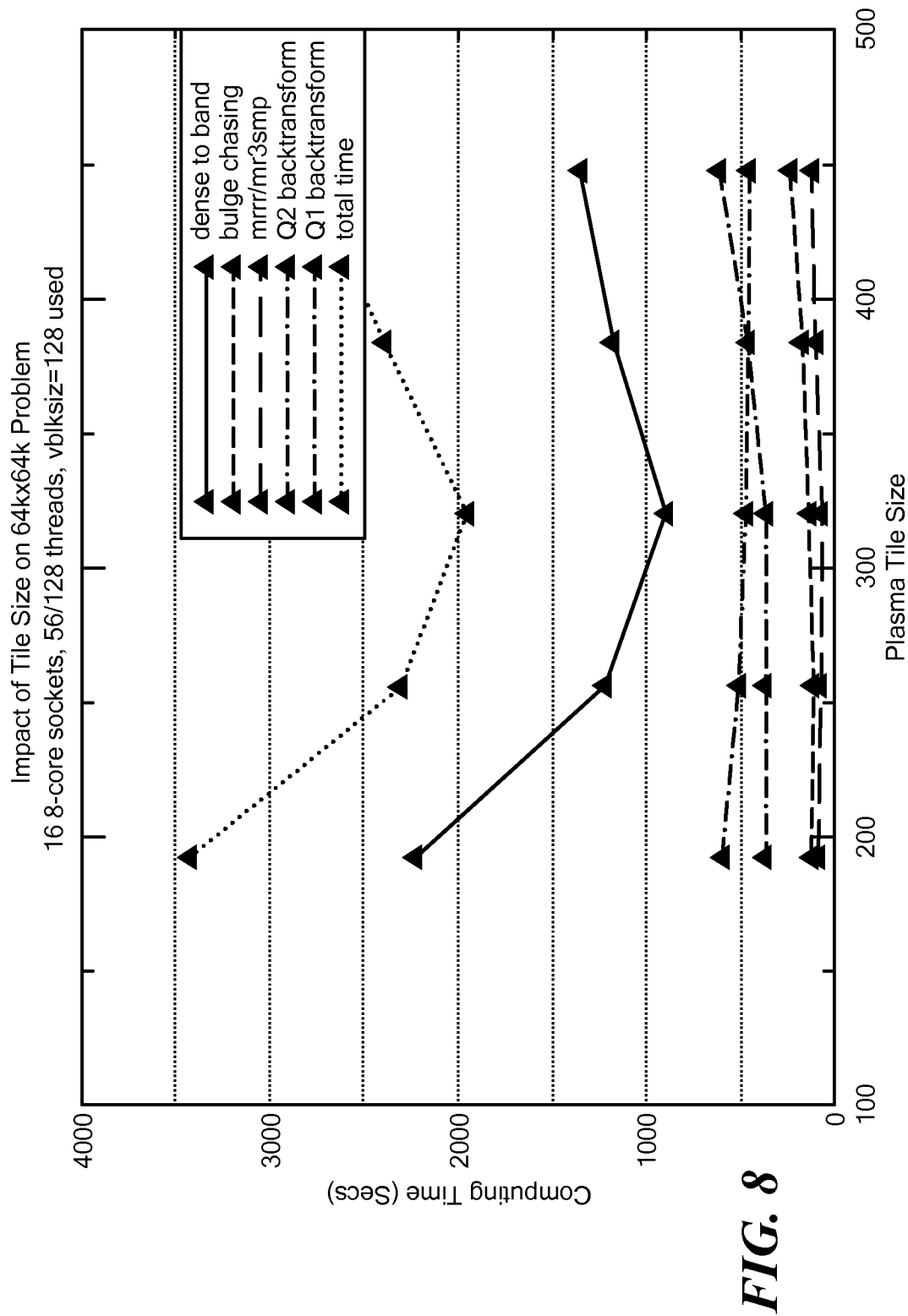
FIG. 8 is a graph showing the impact of variation of a tile size parameter in the computing time of an exemplary embodiment.

There is a tradeoff between the amount of data localization and the overall computational efficiency that must be addressed. On the one hand, if the SBR block (or "tile") size is too large, then the bandwidth of the sparse matrix resulting from process 410 will be high, causing process 420 to take an inefficient length of time. On the other hand, if the SBR tile size is too small, then the data logistic requirements become expensive, and too much time is spent distributing tiles and aggregating results of tile multiplications. Experiments indicate that an optimum tile size for certain Intel® processors used in a test system is anywhere between about 128 and 512 entries on each side of a square tile, and preferably close to 300 entries per side. Other embodiments may be optimized using different tile sizes. The impact of tile size on the overall computing time of an exemplary embodiment is shown in FIG. 8. Note that in order to avoid shared memory network hotspots, all the memory pages are distributed evenly in a round-robin fashion over the computing nodes for achieving the best performance.

The algorithms of FIGS. 5 and 6, for processes 410 and 420 respectively, are described in LAPACK Working Note ("LAWN") 244, which is incorporated by reference in its entirety herein. Process 430 requires computing eigenvectors and eigenvalues of the tridiagonal matrix obtained from process 420. While many methods are available, including power iteration, inverse iteration, the bisection method, and divide-and-conquer, a preferred embodiment uses the multiple relatively robust representations (MRRR) method. The best implementation to date is MR3SMP, and is distributed as open source software separately from PLASMA. This software scales very well on large numbers of processors, unlike existing PLASMA installations.

The LAWN 244 publication did not provide the algorithms for processes 440 and 450. In accordance with an embodiment of the present invention, the tiled algorithms in these two processes construct the Householder reflectors in processes 420 and 410, respectively, and accumulatively apply them to the eigenvectors of the tridiagonal matrix to obtain the eigenvectors of the original matrix. To be explicit, process 440 transforms the computed eigenvectors of the tridiagonal matrix into eigenvectors of the band matrix using data obtained during process 420, and process 450 transforms the eigenvectors of the band matrix into eigenvectors of the input matrix using data obtained during process 410.

The algorithms used in processes 410-450 scale as follows. The floating point intensive work in the eigensolver is done in processes 410, 440, and 450. These processes have floating operation counts of $(4/3)*N^3$, $2*N^3$ and $(4/3)*N^3$, respectively, where N is the dimension of the matrix. Process 420 has $O(N^2)$ floating point operation count, so it can be left out of the eigensolver scalability considerations. Also, the floating point operation count of process 430 is $O(N^2)$ instead of $O(N^3)$, so the MRRR implementation details can be left out of the considerations for the overall eigensolver scalability. Overall, the computation scales as $O(N^3)$, but linear improvements can be made to the runtime by adjusting various parameters, as now described.

The scalability and performance of the three floating point intensive processes 410, 440, 450 are influenced largely by the number of computing threads (NTHDS), the PLASMA tile size (NB), and an internal VBLKSIZ blocking factor that impacts only process 440. Each of these stages would perform most optimally for certain but not necessarily identical NTHDS, NB, and VBLKSIZ. Moreover, if a particular value of NTHDS is less than the available total number of computing cores, the computing threads can be either concentrated on a few nodes, or scattered over many computing nodes, to further alleviate network hotspots. The scattering of the computing threads is controlled by a RANK_MULTIPLIER environmental variable.

Scalability of these processes to very large matrices is hampered by PLASMA's implementation. Before a PLASMA function can be called, the PLASMA infrastructure for a given number of computing cores, and a tile size and other blocking factors need to be initialized, and the tile size and the number of computing cores stay constant throughout the computation until the infrastructure is destroyed. Yet each of the function-call subtasks may be optimized for a different number of cores, tile size values, or blocking factor values.

Since only NB and VBLKSIZ need to be kept constant throughout the different stages, illustrative embodiments of the invention apply the following method to optimize the eigensolver performance on large numbers of multi-core processors. The tile size NB is set to a large enough number to permit efficient computation, but not too large to start to lose performance (see FIG. 8 for an analysis of the impact of tile size on computing time in an order 64 k matrix). In the embodiment tested to produce FIG. 8, the optimal tile size is approximately 320, or at least within the range 256 to 384; other embodiments may have different optimal tile sizes.

Figure 9:
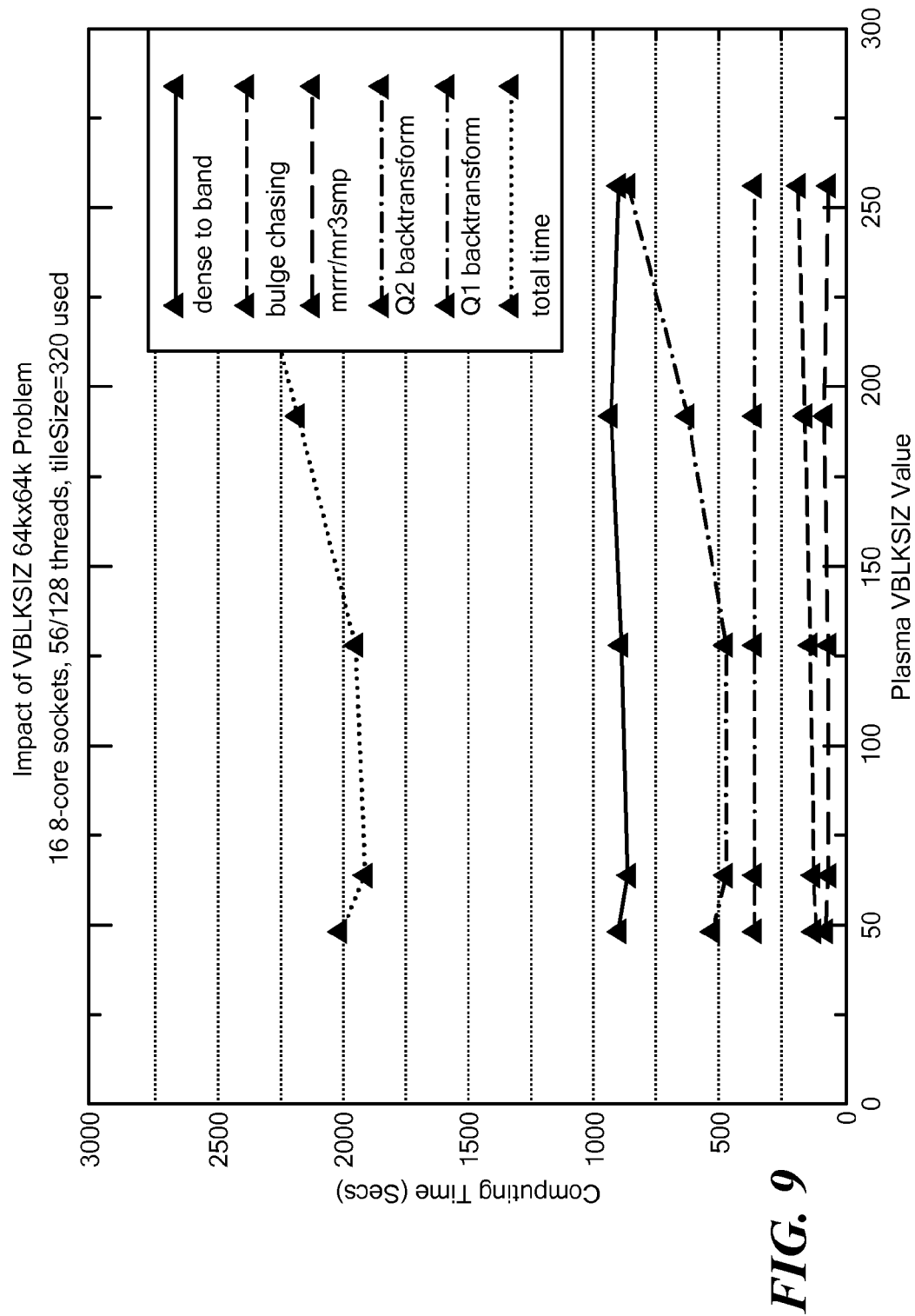
FIG. 9 is a graph showing the impact of variation of a block size parameter in the computing time of an exemplary embodiment.

A performance analysis determines the relative runtimes of the stages. If the process 440 runtime is very large compared to that of process 410 or process 450, VBLKSIZ is increased until the runtime of process 440 no longer dominates that of the other processes. FIG. 9 is a graph showing the impact of variation of the VBLKSIZ parameter in the computing time of an exemplary embodiment. Notice that the value of this parameter affects run time primarily in the Q2 backtransform stage (i.e., process 440). In the embodiment tested to produce FIG. 9, the optimal VBLKSIZ is approximately 64, or at least within the range 48 to 128; other embodiments may have a different optimal VBLKSIZ.

Figure 10A:
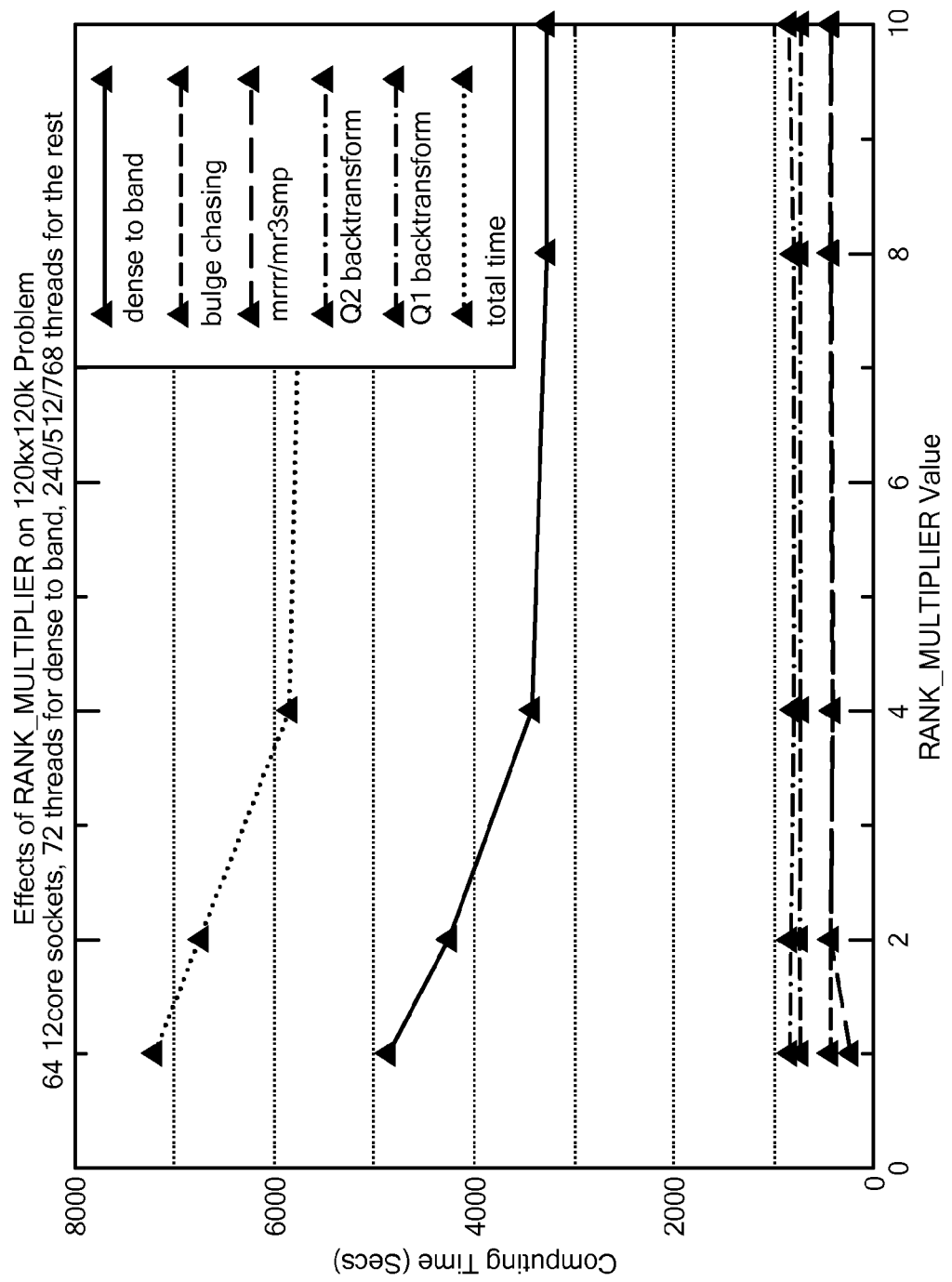
FIG. 10A and FIG. 10B are graphs showing the impact of variation of a rank multiplier parameter on the first process shown in FIG. 4.
Figure 10B:
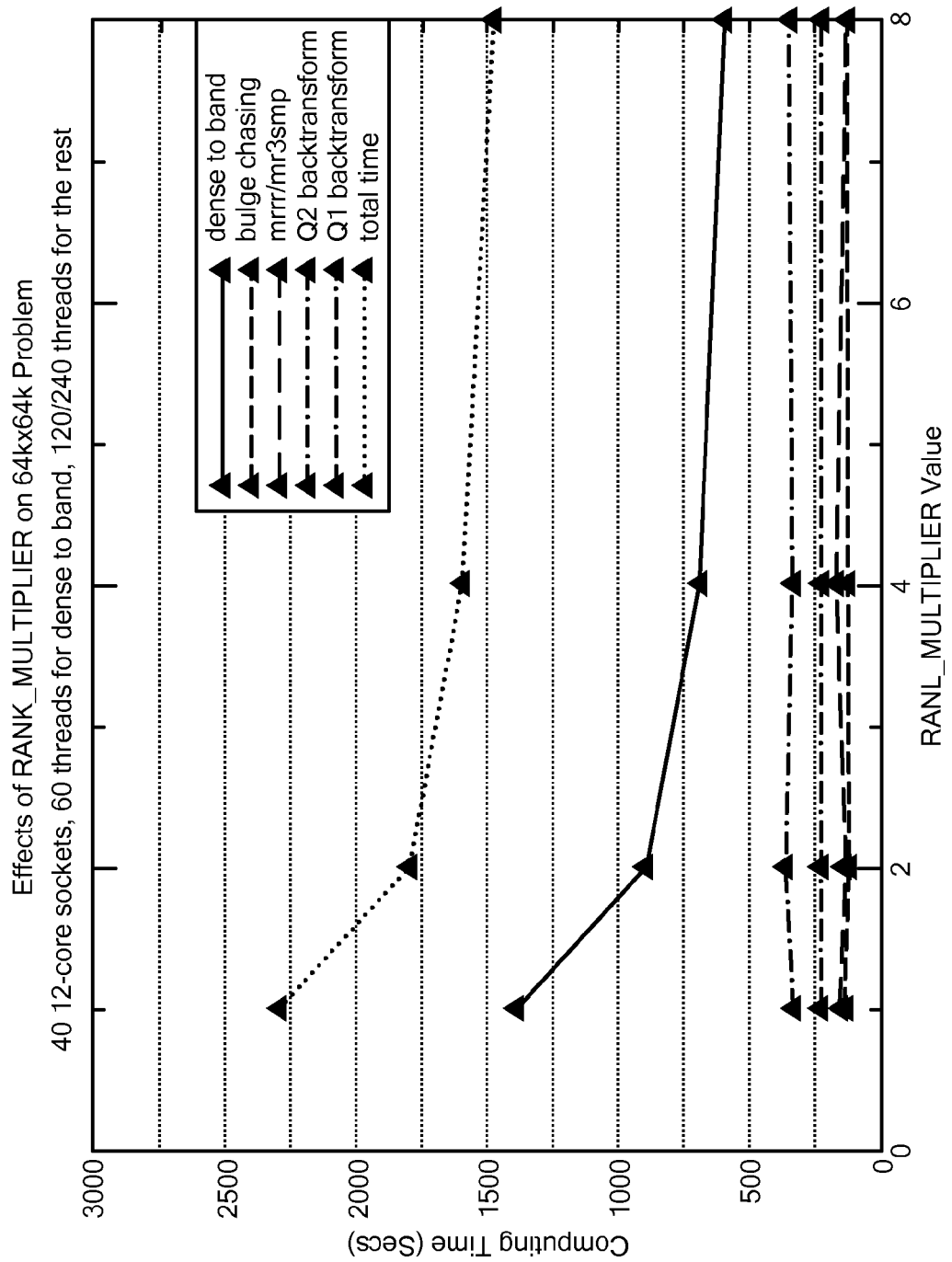

The RANK_MULTIPLIER parameter can be adjusted to improve the performance of process 410. FIG. 10A is an example showing such an optimization for this process in an order 120 k matrix. In the embodiment tested to produce FIG. 10A, the optimal RANK_MULTIPLIER is 8; other embodiments may have a different optimal RANK_MULTIPLIER. FIG. 10B is an example showing such an optimization for this process in an order 64 k matrix.

Figure 11:
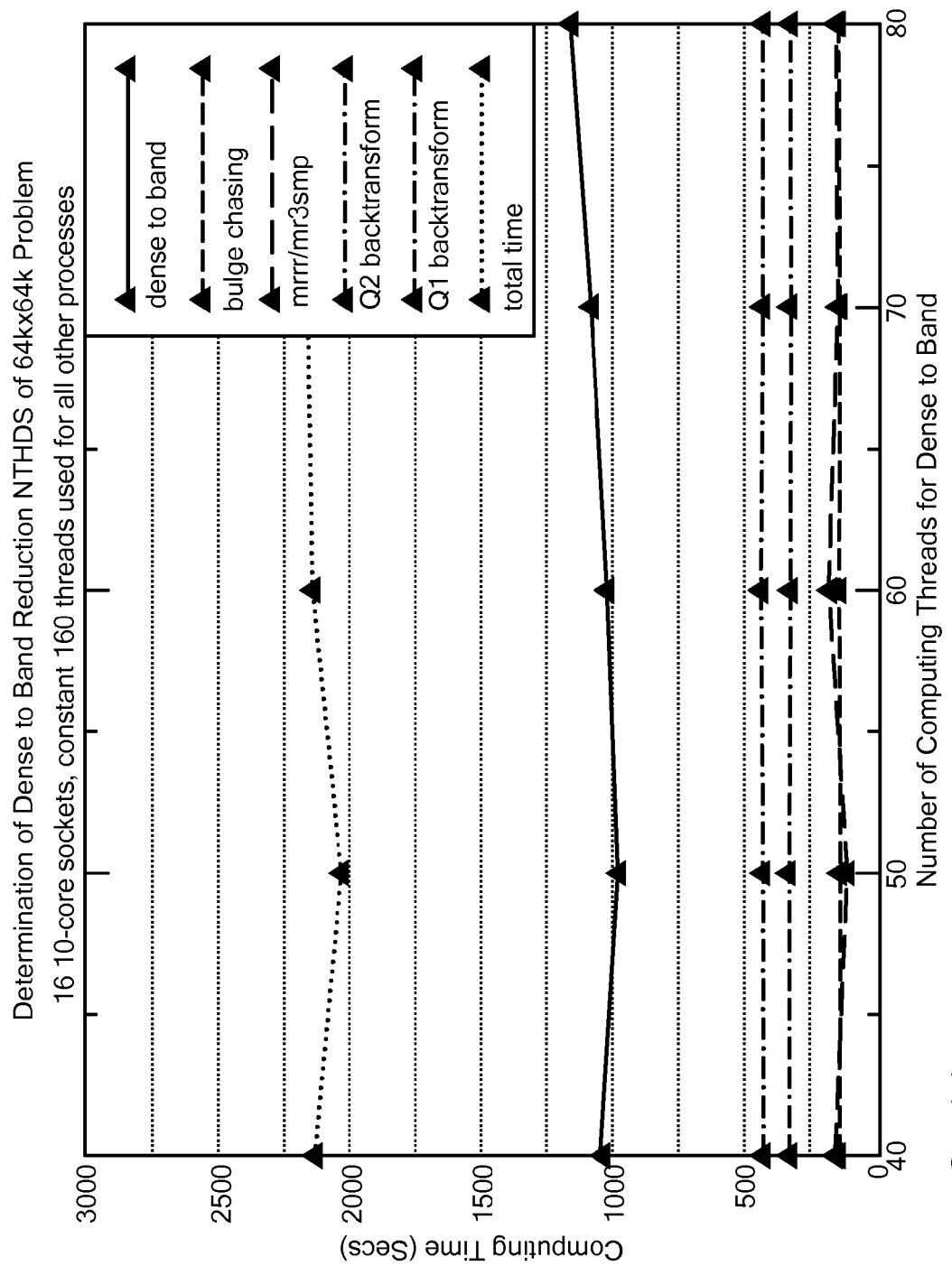
FIG. 11 is a parametric study that determines the best number of computing threads to use for the first process shown in FIG. 4.

During the computation, the PLASMA infrastructure is shut down and reinitiated with a different value of NTHDS between each process 410-450 shown in FIG. 4. The number of threads is separately and respectively determined, for each such process, as a function of the relative runtimes of the processes. In some embodiments, the user of the system may input, to the computer for use in the process, data specifying the number of threads for each phase. In this way, each process 410-450 can use the optimal number of threads. For example, FIG. 11 shows a parametric study for determining the best number of threads (NTHDS) for the dense-to-band reduction (process 410) of an order 64 k matrix. In the embodiment tested to produce FIG. 11, the optimal number of threads is approximately 50, or at least in the range 40 to 60; other embodiments may have a different optimal NTHDS.

Figure 7:
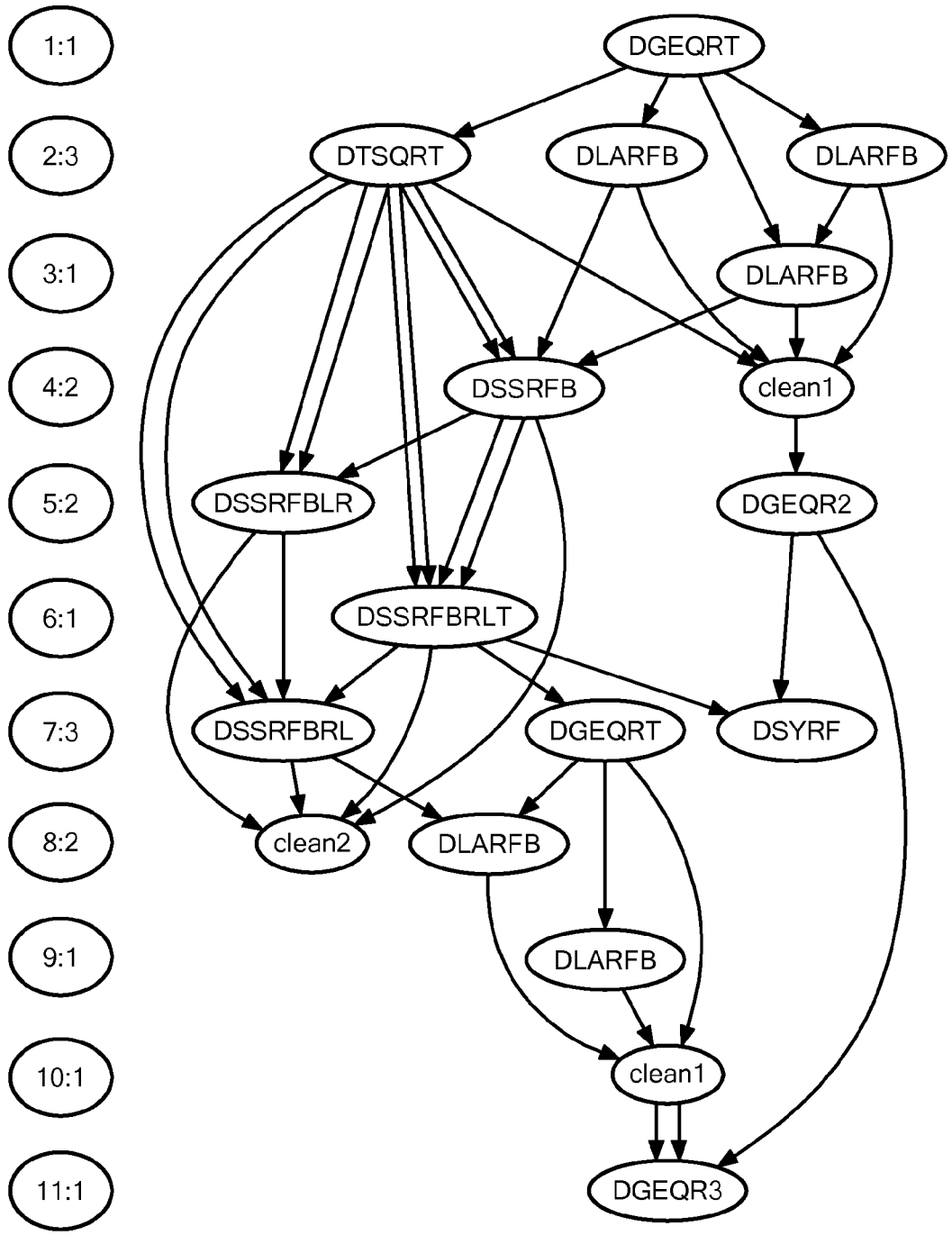
FIG. 7 is a directed acyclic graph (DAG) that shows scheduling dependencies between the various tasks needed to perform the first and second processes shown in FIG. 4, for a 3×3 matrix.

The algorithms used in FIGS. 4-6 may operate using multiple cores in an HPC system 100. PLASMA itself relies on runtime scheduling of parallel subtasks (i.e., functions such as matrix multiplications). However, some subtasks depend on others, and the relationships between the subtasks can be complex. The relationships may be expressed through a task graph, typically shown as a directed acyclic graph (DAG), which can be explored at runtime. An example of the DAG for processes 410 and 420 is shown in FIG. 7. The ovals on the left denote a step in the algorithmic sequence and the number of subtasks that can be executed in parallel in that step. Each subtask may execute on a number of cores. While all processes may be dynamically scheduled using a DAG, processes 440 and 450 may be statically scheduled for improved performance.

Dynamic Hardware Re-Allocation

In one embodiment of computing eigenvectors and eigenvalues of a square matrix in a high performance computing (HPC) system, the computer cores of the HPC are re-allocated for each of the five phases (410-450). Generally, the computer system is organized into 5 different configurations, or partitions for each of the 5 phases described in connection with FIG. 4. For example, the partition/configuration for the $1^{st}$ phase may have say 50 nodes out of a total of 200 in the system, and the partition/configuration for phase 4 may have all the 200 nodes, etc. More detail is provided below.

In the following illustrative embodiment 1200, the software used for performing matrix operations in each of the five phases is as described above, although other software may be used for some or all of the phases. In other words, the embodiments are not limited to the use of the specific software named below.

Figure 12A:
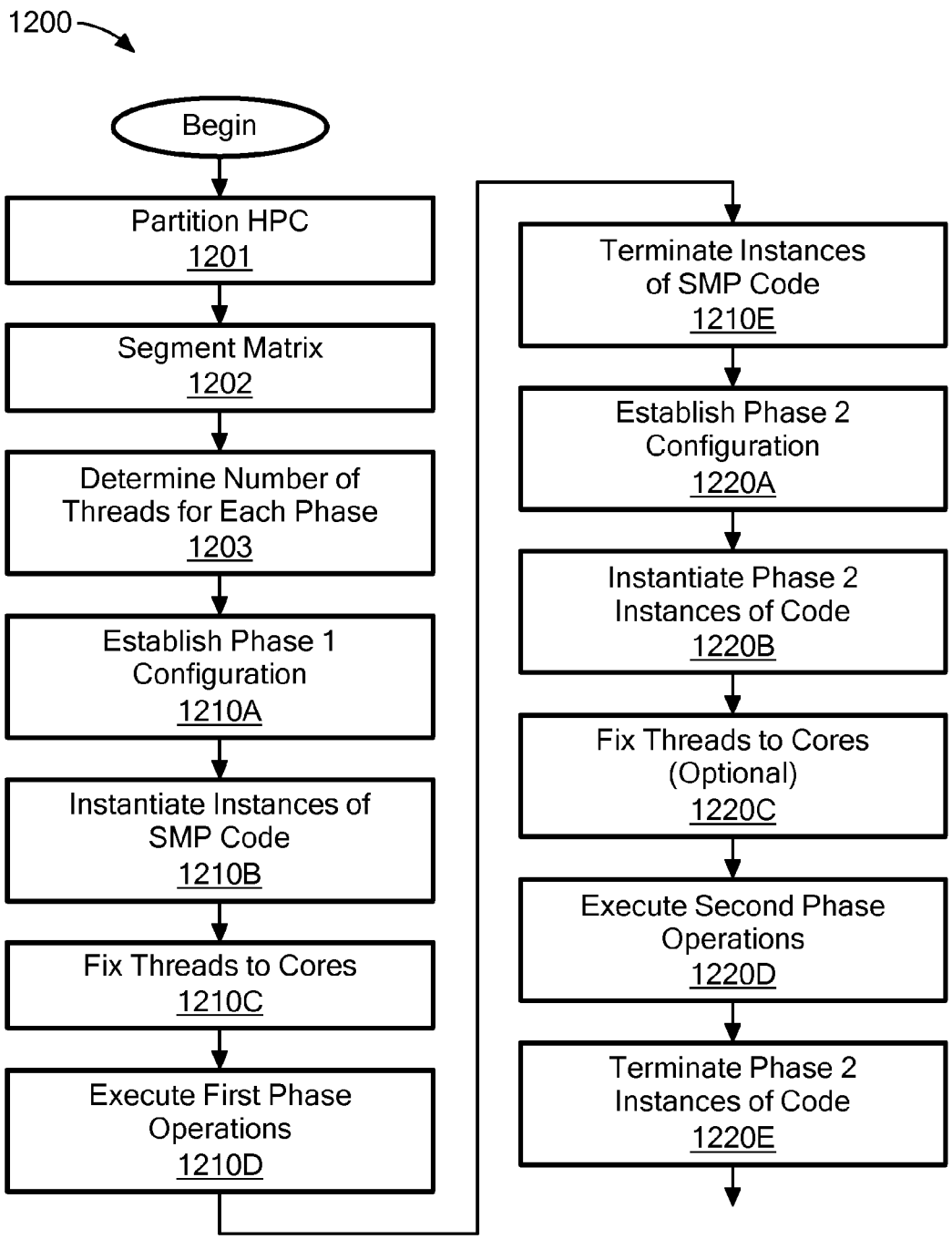
FIGS. 12A and 12B schematically illustrate a method of determining eigenvectors and eigenvalues for a square matrix.
Figure 12B:
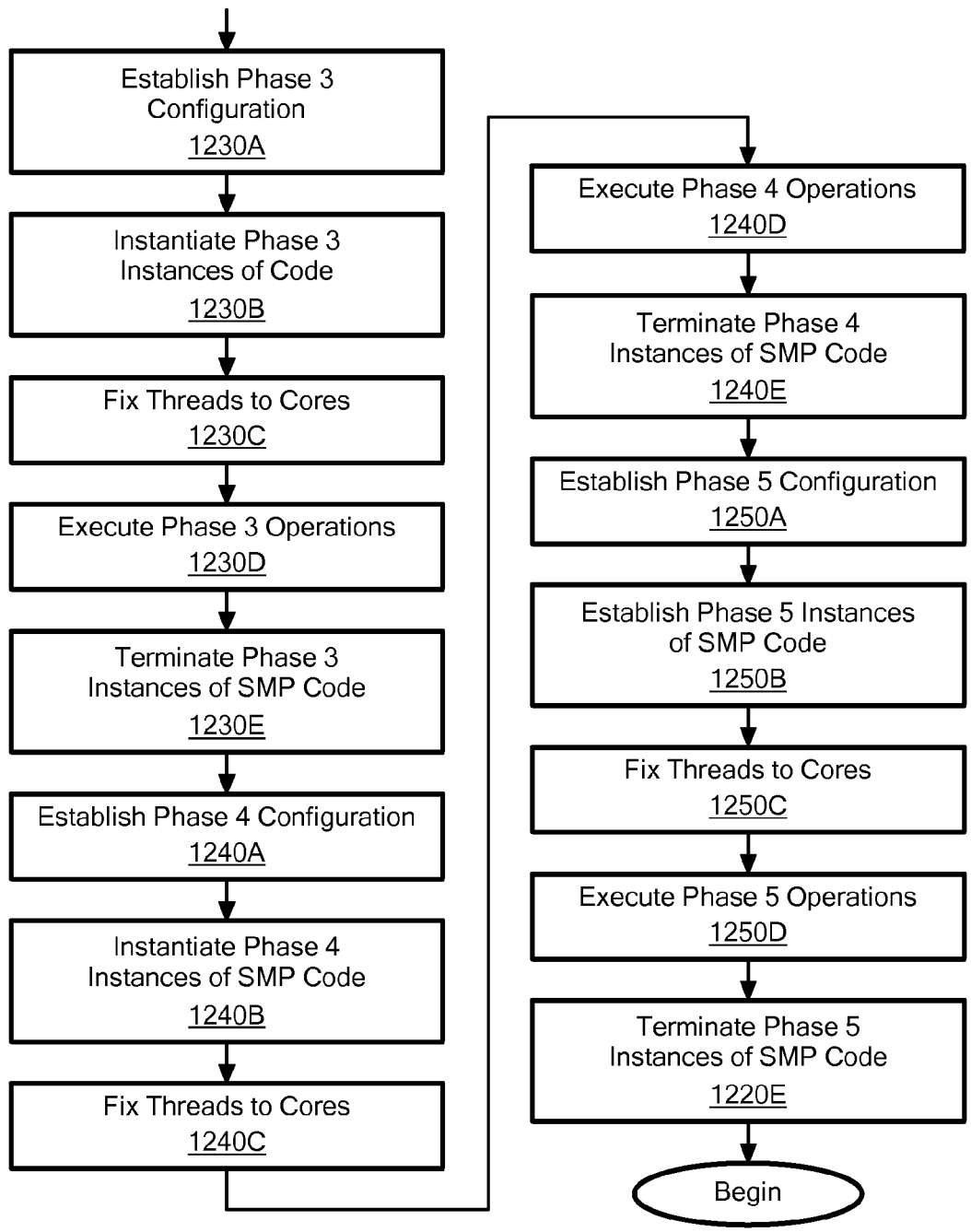

The method 1200 is schematically illustrated in the flow chart of FIG. 12A and FIG. 12B, which together represent a single, illustrative flow. Some steps may be performed in an order other than that shown in FIGS. 12A and 12B, so the order shown is not a limitation on all embodiments.

Figure 13:
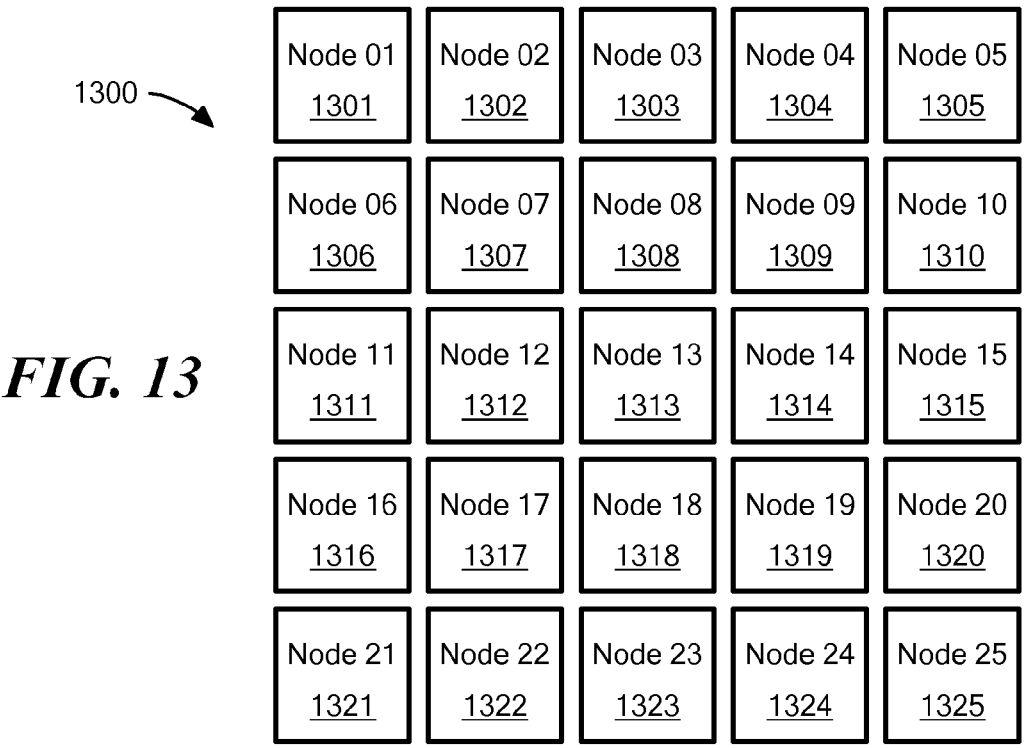
FIG. 13 schematically illustrates a partition of an HPC.

At step 1201, if the resources of a HPC have not already been partitioned, the method allocates the resources of a HPC into one or more partitions. Each partition includes a number of nodes, as schematically illustrated in FIG. 13. In the example of FIG. 13, a partition 1300 includes 20 nodes, although other embodiments may have more or fewer nodes. To that end, step 1201 may include performing some assessment of the square matrix for which eigenvectors and eigenvalues are to be found, for example to determine a number of threads for performing the process and may also include receiving input from a user specifying the number of threads for each phase.

Once established in a partition, the number of nodes in the partition, and consequently the number of cores in the partition, remain fixed throughout the remainder of the process, although the assignment of cores to tasks (e.g., threads to be processed) may change at various phases. In fact, in some phases, some cores may not be used at all, while in other phases all cores in the partition are used to process data.

Figure 14:
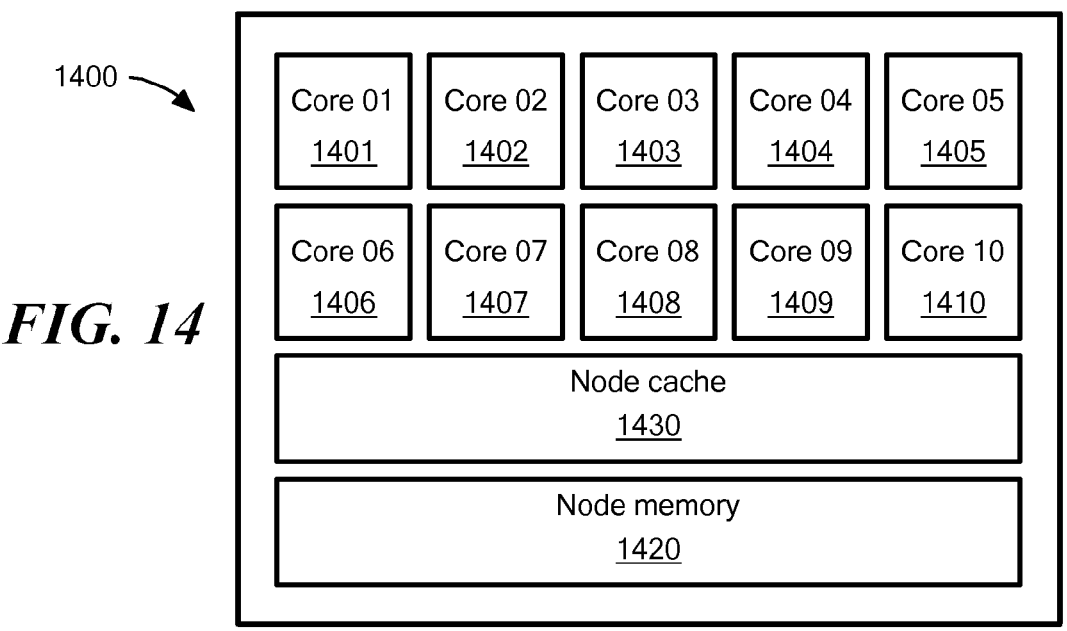
FIG. 14 schematically illustrates a node having a plurality of cores.

An illustrative embodiment of a node 1400 is schematically illustrated in FIG. 14. Each node 1400 includes several cores (e.g., 1401-1410). In this example, the node 1400 has 10 cores, but other embodiments may have more or fewer cores. In total, the partition in this example has 200 cores (20 nodes×10 cores/node=200 cores).

Each node 1400 also includes computer memory. For example, node 1400 has node main memory 1420, and node cache memory 1430. In some embodiments, the node cache memory may be part of the node main memory 1420. A node's main memory and/or node cache memory of each node may be configured such that it is read/write accessible only to the cores of that node, or may be configured such that it is read/write accessible to other nodes and cores. In this illustrative embodiment, the node main memory and node cache memory of each of the nodes in the partition 1300 are configured to allow read/write access to each core in each other node.

In some embodiments, a microprocessor (e.g., on a blade) may be a single integrated circuit having several cores and associated memory. Such a microprocessor may form a node, since it has cores and memory. In other embodiments, two or more microprocessor integrated circuits, for example each in its own socket on a blade, may together form a node. An advantage of defining nodes by processor integrated circuit, or by processors in closely-spaced sockets, is that each of the cores on such nodes has local access the node's memory, since that memory is on the integrated circuit(s). In this way, access by the cores to the node memory may be faster than the cores' access to other memory, such as memory on other nodes for example. Also, a core's access to data on the same node avoids the complexities of accessing data that is not on the node (which may be known as "off-node" data).

Figures 15, 16:
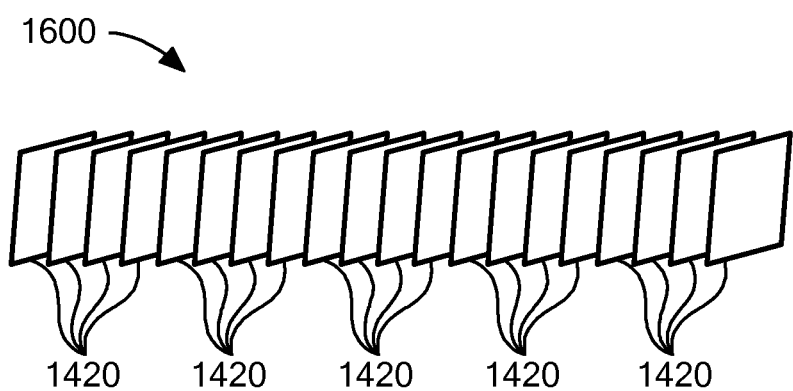
FIG. 15 schematically illustrates tiles of a square matrix.
FIG. 16 schematically illustrates data of the square matrix arranged in an interleaved format.

At step 1202, the method 1200 segments the square matrix 1500 into a number of sub-matrices, or "tiles," (e.g., 1501-1520), each of which is a digestible matrix in view of the band reduction software as described below, as schematically illustrated in FIG. 15. The number of tiles may be specified by the user, via user input. In some embodiments, the number of tiles would be much greater than the total number of processing cores.

To store the tiles, the software distributes the tiles over the memories of the various nodes in the partition. In some embodiments, the method stores the data in interleaved form (see, for example, FIG. 16, in which the node memories 1420 are configured to store data in an interleaved fashion. Collectively, the memory may be referred to as the "partition memory." Later in the process 1200, the nodes will operate on that data.

It is worth noting that prior art methods also segmented a square matrix into tiles, and stored the tiles on the memory of the available nodes. However, in prior art methods, each node only operated on the data (i.e., tile) stored in its own node memory. Each node was unable to access data in the node memories of other nodes. This approach had the benefit of keeping data access simple, since all the data of a tile was in memory local to the core operating on that data. A downside to this approach, however, arises when some computations to be performed by a core require, as input, the results of a computation performed on, and stored in the node memory of, another node. That is unlike present embodiments, however, in which all node memories (e.g., the partition memory) are accessible by all other nodes. In at least some phases of present embodiments, the HPC computer system is configured to run two levels of SMP processing, in which, at an intra-node level, each node (i.e., the cores in each node) runs software (e.g., band reduction software, to name but one example) in an SMP configuration, and in which, at an inter-node level, several nodes operate in an SMP configuration. This may be referred to as "nested SMP."

At step 1203, the method determines the number of threads to be used in each phase (e.g., 410-450). For example, the user may determine, or receive as input from a user, the number of threads based on the size of the square matrix for which eigenvectors are to be found. The number of threads may be different for the various phases, so that the threads may be referred to as "Phase 1 threads," "Phase 2 threads," "Phase 3 threads," "Phase 4 threads," and "Phase 5 threads" As described in more detail below, the hardware resources of the HPC computer are reallocated for each phase based in part on the number of threads used in that phase.

The dense to band reduction phase is very sensitive to the tile size and the number of threads that are used for the computation. For about the same computing resources, the dense to band performance may differ by one order of magnitude if the number of threads and the tile size are not close enough to the optimal values. The optimal values for the tile size and the number of threads also would change with the problem size.

An approach to provide estimates for the Phase 1 performance based on the tile size, the number of threads and the problem size involves executing a truncated Phase I software for just several iterations using preliminary guesses or estimates of the tile size and a number of threads for a problem size. Timing measurements from the several iteration are then used to project the Phase I performance for the particular tile size, number of threads, and problem size. The process is repeated several times with different tile sizes, numbers of threads for the same problem size, in order to determine the best (or at least good) tile size and number of threads for the problem size. The approach may even be implanted in the form of a software tool. The user can run the tool quickly as a pre-step to determine the tile size, which will be used for all 5 phases, and the number of threads to use for Phase 1, before the eigensolution starts.

Note that once the tile size and the number of threads are determined for a problem size. The same values can be used for somewhat similar problem sizes and there is no need to rerun the tool. The numbers of threads for the other 4 phases can be easily determined from past experience and the performance of these phases are not as sensitive to these parameters. It is possible to embed the Phase 1 performance estimator tool in the eigensolver as an autotune function to be executed first.

Phase 1: Reduce Square Matrix to Band Form

At step 1210A, and based on the number of threads to be used by the partition to process the tiles in the first phase (e.g., 410, which phase may be known as "Phase 1," and the threads may be referred to as "Phase 1 threads"), the method 1200 establishes a first configuration of the available cores.

Figure 17A:
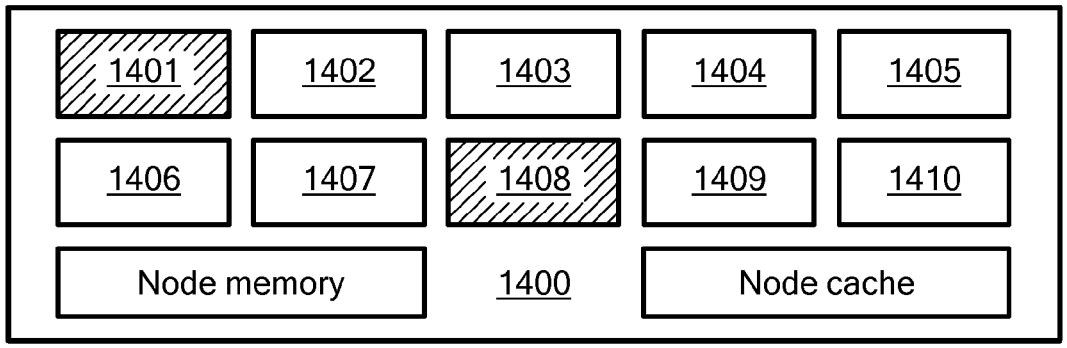
FIGS. 17(A)-17(C) schematically illustrate nodes with cores allocated for various phases of a process.
Figure 17B:
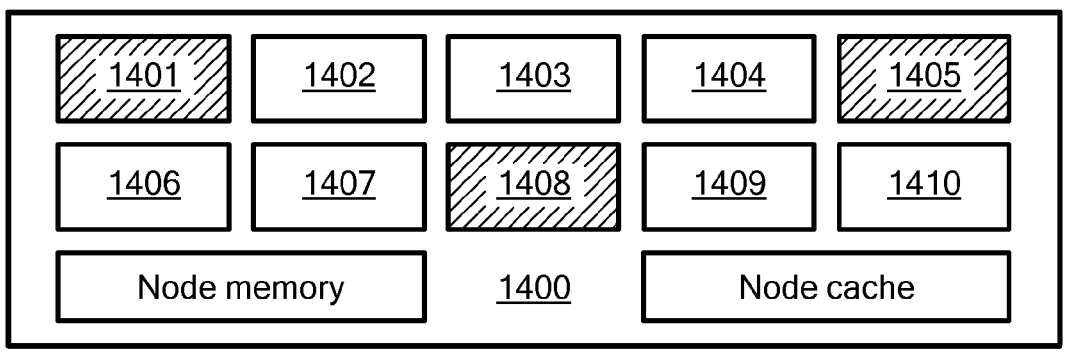

The cores assigned to process threads (the "allocated cores") may be all of the cores in the partition, or a subset of those cores, depending on the number of threads. For example a configuration for Phase 1 may use only cores 1 and 8 of each node, as schematically illustrated by shaded cores in FIG. 17(A). As another example a configuration for Phase 1 may use only cores 1, 5 and 8 of each node, as schematically illustrated by shaded cores in FIG. 17(B). Cores not used (i.e., not allocated to process data) in this phase are shown as un-shaded rectangles.

At step 1210B, the method instantiates instances of band reduction software on each node, so that one core on the node (e.g., core 1401) executes a "master" instance of the software. Other allocated cores on the node (e.g., core 1408) execute a "slave" instance of the software. Collectively, the master instances and the slave instances of the software may be referred to as the "Phase 1 Instances." Each core on each node has access to the partition memory. Each node therefore runs in SMP mode.

At step 1210C, each thread is affixed to a corresponding one of the cores (e.g., in this example, cores 1401 and 1408 of each node). In other words, each thread remains pinned to its corresponding core, such that the thread will not be transferred (e.g., by the operating system) to another core or other node. A core may be dedicated to a thread (or, stated alternately, a thread may be "affixed," or "fixed" or "pinned" to a specific core) by preventing a computer's operating system from performing a function that typical operating systems perform: reassigning threads among cores. Pinning a thread to a core may be done by configuring a computer's operating system, or by software running under a computer's operating system. As just one example, some of Microsoft's Windows operating systems include a "SetThreadAffinityMask" function that can be set by a user, or software running on the operating system, to identify a logical processor (e.g., a core) that the thread is allowed to run on. As another example, SGI's "DPLACE" tool is used to bind a related set of processes to specific cores or nodes to prevent process migrations.

This is different from the operation of a typical computer, in which the computer's operating system assigns and reassigns threads to cores, for example depending on what thread is next to be executed and what core is available. Generally, in the prior art, the threads are agnostic as to which core executes them, and the cores are agnostic as to which thread they execute, so such an approach tends to make efficient use of available computing resources. However, such an approach may also move or migrate a thread from a first core to second core. If the second core is on another node, such that the second core does not have access to the cache memory of the first node, the computations may be slowed or made less efficient, since the thread does not have access to the data that the thread had previously used from, and/or stored in, that cache. Allocating a core to a thread, in effect, dedicates the core's hardware to that thread during the first phase (410) of the process, thereby improving the operation of the HPC in executing that first phase of the process.

Note that an HPC configured in this way is distinguishable from the prior art machines and methods, in which each node operated essentially in isolation from the other nodes. An HPC configured in this way is also distinguishable from a hypothetical machine having all the available cores and memory in one node (i.e., a partition configured as one giant node), since such a hypothetical machine must have a single instance of software capable of operating the number of threads required at all phases. Here, note that the size of a matrix on which PLASMA can operate is limited, such that a single instance of PLASMA would not be capable of operating such a hypothetical machine for a large matrix (i.e., a matrix exceeding PLASMA's limits).

With the configuration of the system established as described above, the instances of the band reduction software operate on (e.g., perform matrix operations on) the sub-matrices (e.g., tiles) to reduce the square matrix to band form (step 1210D), as described above. When the matrix operations are complete, the method stores the band matrix in the memory.

At step 1210E, the process terminates the instances of the software (the Phase 1 Instances) described above. Generally, for the phases described in process 1200, termination of the processes permits the software for subsequent phases to be instantiated with the number of threads determined for each such phase.

Phase 2: Reduce the Band Matrix to Tridiagonal Form

The second phase ("Phase 2") of the process (e.g., 420 of FIG. 4) begins at step 1220A, to reduce the band matrix to tridiagonal form.

At step 1220A, the method establishes the configuration of the partition for Phase 2, by allocating several cores from among the cores in the partition for executing tridiagonal reduction software. The selected cores may be all of the cores in the partition, or a subset of those cores, depending for example on the number of Phase 2 threads. For example, a configuration for Phase 2 may use only cores 1, 5 and 8 of each node, as schematically illustrated by shaded cores in FIG. 17(B). Cores not used (i.e., not allocated to process data) in this phase are shown as un-shaded rectangles.

Then, at step 1220B, the method instantiates instances of tridiagonal reduction software on each node, so that one core on the node (e.g., core 1401) executes a "master" instance of the software, and other allocated cores on the node (e.g., core 1405 and core 1408) execute a "slave" instance of the software. Collectively, the master instances and the slave instances of the software may be referred to as the "Phase 2 Instances." Each core on each node may have access to the partition memory, such that each node runs in SMP mode.

At step 1220C, each thread may optionally be affixed to a corresponding one of the cores (e.g., in this example, cores 1401, 1405 and 1408 of each node). In other words, each thread remains pinned to its corresponding core, such that the thread will not be transferred (e.g., by the operating system) to another core or other node. However, the matrix operations in Phase 2 are not as computationally demanding as in at least some of the other phases, and so affixing the threads to corresponding cores is optional. In fact, each thread may also optionally be affixed to a corresponding one of the cores in Phase 3 and Phase 4, the process for which are described below.

With the configuration of the system established as described above for Phase 2, the instances of the software perform matrix operations on the banded matrix to reduce the banded matrix to tridiagonal form (step 1220D), as described above. When the matrix operations are complete, the method stores the tridiagonal form matrix in the partition memory.

At step 1220E, the process terminates the instances of the software (the Phase 2 Instances) described above.

Phase 3: Determine Eigenvectors and Eigenvalues of the Tridiagonal Matrix

The third phase ("Phase 3") of the process (e.g., 430 of FIG. 4) begins at step 1230A, to determine eigenvectors and eigenvalues of the tridiagonal matrix.

At step 1230A, the method establishes the configuration of the partition for Phase 3, by allocating cores from among the cores in the partition for use in processing the Phase 3 threads. The selected cores may be all of the cores in the partition, or a subset of those cores, depending on the number of Phase 3 threads to be processes. For example a configuration for Phase 3 may use only cores 1, 5 and 8 of each node, as schematically illustrated by shaded cores in FIG. 17(B). Cores not used (i.e., not allocated to process data) in this phase are shown as un-shaded rectangles.

Then, at step 1230B, the method instantiates instances of tridiagonal eigensolution software on each node, so that one core on the node (e.g., core 1401) executes a "master" instance of the software, and other allocated cores on the node (e.g., core 1405 and core 1408) each execute a "slave" instance of the software. Collectively, the master instances and the slave instances of the software may be referred to as the "Phase 3 Instances." Each core on each node has access to the partition memory. Each node therefore runs in SMP mode.

At step 1230C, each thread may optionally be affixed to a corresponding one of the cores (e.g., in this example, cores 1401, 1405 and 1408 of each node). In other words, each thread remains pinned to its corresponding core, such that the thread will not be transferred (e.g., by the operating system) to another core or other node.

With the configuration of the system established as described above for Phase 3, the instances of the software perform matrix operations on the tridiagonal matrix to determine eigenvectors and eigenvalues of the tridiagonal matrix (step 1230D), as described above. When the matrix operations are complete, the method stores the eigenvectors and eigenvalues in the partition memory.

At step 1230E, the process terminates the instances of the software (the Phase 3 Instances) described above.

By then end of Phase 3, the method has found the eigenvalues of the tridiagonal matrix, which are the same as the eigenvalues of the square matrix, and has also found the eigenvectors of the tridiagonal matrix. However, the eigenvectors of the tridiagonal matrix are expressed with reference to the tridiagonal matrix. In order to express the eigenvectors of the tridiagonal matrix with reference to the original square matrix with which the process started, the process proceeds to Phase 4 and Phase 5 (e.g., 440 and 450 in FIG. 4).

Phase 4: Transform Eigenvectors to the Banded Reference System

The fourth phase ("Phase 4") of the process (e.g., 440 of FIG. 4) begins at step 1240A, to transform eigenvectors to the banded reference system.

At step 1240A, the method establishes the configuration of the partition for Phase 4, by allocating cores from among the cores in the partition for use in processing the Phase 4 threads. The selected cores may be all of the cores in the partition, or a subset of those cores, for example depending on the number of Phase 4 threads. For example a configuration for Phase 4 may use only cores 1, 5 and 8 of each node, as schematically illustrated by shaded cores in FIG. 17(B). Cores not used (i.e., not allocated to process data) in this phase are shown as un-shaded rectangles.

Then, at step 1240B, the method instantiates instances of band backtransform software on each node, so that one core on the node (e.g., core 1401) executes a "master" instance of the software, and other allocated cores on the node (e.g., core 1405 and core 1408) each execute a "slave" instance of the software. Collectively, the master instances and the slave instances of the software may be referred to as the "Phase 4 Instances." Each core on each node has access to the partition memory. Each node therefore runs in SMP mode.

At step 1240C, each thread may optionally be affixed to a corresponding one of the cores (e.g., in this example, cores 1401, 1405 and 1408 of each node). In other words, each thread remains pinned to its corresponding core, such that the thread will not be transferred (e.g., by the operating system) to another core or other node.

With the configuration of the system established as described above for Phase 4, the instances of the software perform matrix operations on the eigenvectors of the tridiagonal matrix to transform those eigenvectors to eigenvectors of (i.e., expressed with reference to) the band matrix (step 1240D), as described above. When the matrix operations are complete, the method stores the eigenvectors of the band matrix in the partition memory.

At step 1240E, the process terminates the instances of the software (the Phase 4 Instances) described above.

Phase 5: Transform Eigenvectors to the Dense Reference System

The fifth phase ("Phase 5") of the process (e.g., 450 of FIG. 4) begins at step 1250A, to transform eigenvectors of the band matrix to eigenvectors of the square matrix.

Figure 17C:
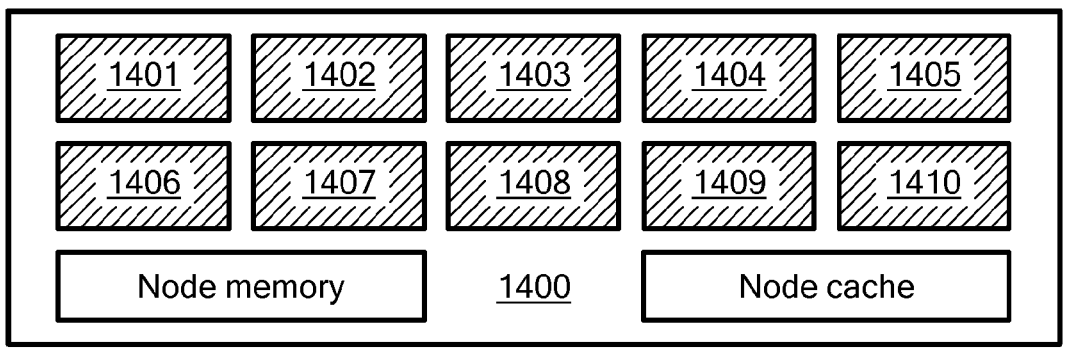

At step 1250A, the method establishes the configuration of the partition for Phase 5, allocating cores from among the cores in the partition for use in processing the Phase 5 threads. The selected cores may be all of the cores in the partition, or a subset of those cores, depending on the number of Phase 5 threads. For example a configuration for Phase 5 may use cores 1-10 of each node, as schematically illustrated by shaded cores in FIG. 17(C).

Then, at step 1250B, the method instantiates instances dense backtransform software on each node, so that one core on the node (e.g., core 1401) executes a "master" instance of the software, and other allocated cores on the node (e.g., cored 1402 and core 1410) each execute a "slave" instance of the software. Collectively, the master instances and the slave instances of the software may be referred to as the "Phase 5 Instances." Each core on each node has access to the partition memory. Each node therefore runs in SMP mode.

At step 1250C, each thread is affixed to a corresponding one of the cores (e.g., in this example, cores 1401-1410 of each node). In other words, each thread remains pinned to its corresponding core, such that the thread will not be transferred (e.g., by the operating system) to another core or other node.

With the configuration of the system established as described above for Phase 5, the instances of the software perform matrix operations on the band matrix eigenvectors to transform the band matrix eigenvectors to the eigenvectors of (i.e., expressed with reference to) the original square matrix (step 1250D), as described above. When the matrix operations are complete, the method stores the transformed eigenvectors in the partition memory.

At step 1250E, the process terminates the instances of the software (the Phase 5 Instances) described above.

A system 1800 for computing eigenvectors and eigenvalues of a square matrix is schematically illustrated in FIG. 18, and includes modules 1801-1810 for performing the functions of method 1200.

Generally, the system 1800 includes modules for performing the steps of the method 1200. Such a system 1800 may be formed, in whole or in part, from an HPC system as described above.

As schematically illustrated in FIG. 18, the system 1800 includes a user interface 1811, configured to receive input from a user. Such input may include, for example, specification of the number of threads for each phase, input of a matrix for which eigenvectors are to be found, and commands to control the computer, to name but a few examples. The user interface 1801 may be a remote computer 240, for example.

The system 1800 also includes a partition module configured to define a partition of an HPC.

The system 1800 also includes a node allocation module 1802 configured to define a plurality of nodes from the cores of a partition.

The system 1800 also includes a segmentation module 1803 configured to segment a square matrix into a plurality of tiles. The segmentation module may include computer hardware of an HPC, controlled by software.

The system 1800 also includes a memory module 1804 configured to store the plurality of tiles and the input and output data to/from each phase of the process (e.g., phases 410-450).

The system 1800 also includes a node configuration module 1805, configured to establish a configuration for each node, for example based on the threads to be executed on each such node.

The system 1800 also includes a band reduction module 1806 configured to reduce the square matrix to a band matrix by operating on the tiles.

The system 1800 also includes a tridiagonal module 1807 configured to transform the band matrix to a tridiagonal matrix.

The system 1800 also includes tridiagonal eigensolution module 1808 to determine the eigensolutions of the tridiagonal matrix.

The system 1800 also includes a band eigenvector module 1809 configured to transform the eigenvectors of the tridiagonal matrix to eigenvectors of the band matrix (i.e., express the eigenvectors of the tridiagonal matrix with reference to the band matrix system).

The system 1800 also includes a dense eigenvector module configured to transform the eigenvectors of the band matrix to eigenvectors of the square matrix (i.e., express the eigenvectors of the band matrix with reference to the square matrix system).

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A computerized method for computing eigenpairs of a large square matrix in a high performance computing (HPC) system having a plurality of nodes, each node including one or more processing cores for executing program threads, the nodes having non-uniform memory access, the method comprising:

allocating the computing resources of the high performance computing system into a plurality of partitions, each partition comprising memory and a plurality of computer processor cores;

allocating the computing resources of the one of the plurality of partitions into a plurality of partition nodes, each partition node comprising associated node memory and a plurality of the computer processor cores;

segmenting the large square matrix of data into a plurality of digestible sub-matrices;

storing the plurality of sub-matrices in a partition memory, which partition memory is accessible by each node, such that all of the sub-matrices are accessible by each of the nodes, the partition memory comprising the plurality of node memories;

in a first phase, reducing the square matrix to band form by:
  instantiating an instance of band reduction software on one of the plurality of partition nodes, the band reduction software employing a user-specified first number of threads for executing first phase matrix operations on the sub-matrices;
  instantiating additional instances of band reduction software on additional partition nodes;
  dedicating, within each of the partition nodes, one of the plurality of cores to a corresponding one of the plurality of threads;
  creating a band matrix from the square matrix by performing matrix operations on the sub-matrices using the band reduction software, each of the threads accessing the sub-matrices from the partition memory, such that each node executes its corresponding instance of the computer software in an SMP mode;
  storing the band matrix in band-matrix segments in the partition memory; and
  terminating the instances of the band reduction software;

in a second phase, reducing the band matrix to tridiagonal form by:
  instantiating an instance of tridiagonal reduction software on one of the plurality of nodes, the tridiagonal reduction software employing a second number of user-specified second phase threads for executing second phase matrix operations on the band matrix;
  creating a tridiagonal matrix by performing matrix operations on the band-matrix using the tridiagonal reduction software, each of the second phase threads accessing the band-matrix from the partition memory;
  storing the tridiagonal matrix in the partition memory; and
  terminating the instances of tridiagonal reduction software;

in a third phase, computing eigenvectors and eigenvalues of the tridiagonal matrix by:
instantiating an instance of tridiagonal eigensolution software on a partition node, the tridiagonal eigensolution software employing a third number of user-specified third phase threads for executing third phase matrix operations on the tridiagonal matrix;
determining the eigenvectors and eigenvalues of the tridiagonal matrix by performing matrix operations on the tridiagonal matrix using the tridiagonal eigensolution software;
storing the eigenvectors and eigenvalues of the tridiagonal matrix in the partition memory; and
terminating the instances of the tridiagonal eigensolution software;
determining the eigenpairs of the square matrix by
in a fourth phase, transforming the eigenvectors of the tridiagonal matrix to eigenvectors of the band matrix by:
instantiating an instance of band backtransform software on one of the plurality of partition nodes, the band backtransform software employing a fourth number of user-specified fourth phase threads for executing fourth phase matrix operations on the eigenvectors of the tridiagonal matrix;
transforming the eigenvectors of the tridiagonal matrix to eigenvectors of the band matrix by performing matrix operations on the eigenvectors of the tridiagonal matrix using the band backtransform software;
storing the eigenvectors of the band matrix in the partition memory; and
terminating the instances of the band backtransform software;
in a fifth phase, transforming the eigenvectors of the band matrix to eigenvectors of the square matrix by:
instantiating an instance of dense backtransform software on one of the partition nodes, the dense backtransform software employing a fifth number of user-specified fifth phase threads for executing fifth phase matrix operations on the eigenvectors of the band matrix;
instantiating additional instances of the dense backtransform software on the partition nodes;
dedicating, within each of partition nodes, one of the plurality of cores to a corresponding one of the plurality of fifth phase threads;
transforming eigenvectors of the band matrix to eigenvectors of a square matrix by performing matrix operations on the eigenvectors of the band matrix using the dense backtransform software, each of the fifth phase threads accessing the eigenvectors of the band matrix from the partition memory, such that each node executes its corresponding instance of the dense backtransform software in an SMP mode; and
storing the eigenvectors of the square matrix in the partition memory.

2. The computerized method for computing eigenpairs of a large square matrix of claim 1, wherein storing the plurality of sub-matrices in a partition comprises storing the plurality of sub-matrices in an interleaved configuration.

3. The computerized method for computing eigenpairs of a large square matrix of claim 1, wherein the band reduction software comprises PLASMA.

4. The computerized method for computing eigenpairs of a large square matrix of claim 1, wherein the tridiagonal eigensolution software comprises the MR3SMP package.

5. A computer-based system for computing eigenpairs of a large square matrix, comprising:

a user interface configured to receive input from a user;
a segmentation module configured to segment a square matrix into a plurality of tiles;
a memory module configured to store the plurality of tiles;
a node configuration module configured to allocate cores to threads, to allocate the cores into a plurality of configurations corresponding to a plurality of phases of a process for computing the eigenvectors, the plurality of configurations comprising:
a band reduction module configured to reduce the square matrix to a band matrix by operating on the tiles;
a tridiagonal module configured to transform the band matrix to a tridiagonal matrix;
a tridiagonal eigenpair module configured to determine eigenpairs of the tridiagonal matrix;
a band eigenvector module configured to transform the eigenvectors of the tridiagonal matrix to eigenvectors of the band matrix; and
a dense eigenvector module configured to transform the eigenvectors of the band matrix to eigenvectors of the square matrix.

6. The system for computing eigenpairs of a large square matrix of claim 5, wherein the user interface comprises a computer monitor.

7. The system for computing eigenpairs of a large square matrix of claim 5, wherein each node comprises node memory, and the memory module comprises the node memories.

8. The system for computing eigenpairs of a large square matrix of claim 7, wherein the memory module comprises interleaved memory.

9. A non-transient computer readable medium storing executable code configured to execute on an HPC, the code comprising code for causing the HPC to:
allocate the computing resources of the high performance computing system into a plurality of partitions, each partition comprising memory and a plurality of computer processor cores;
allocate the computing resources of the one of the plurality of partitions into a plurality of partition nodes, each partition node comprising associated node memory and a plurality of the computer processor cores;
segment the large square matrix of data into a plurality of digestible sub-matrices;
store the plurality of sub-matrices in a partition memory, which partition memory is accessible by each node, such that all of the sub-matrices are accessible by each of the nodes, the partition memory comprising the plurality of node memories;
in a first phase, reducing the square matrix to band form by:
instantiating an instance of band reduction software on one of the plurality of partition nodes, the band reduction software employing a user-specified first number of threads for executing first phase matrix operations on the sub-matrices;
instantiating additional instances of band reduction software on additional partition nodes;
dedicating, within each of the partition nodes, one of the plurality of cores to a corresponding one of the plurality of threads;
creating a band matrix from the square matrix by performing matrix operations on the sub-matrices using the band reduction software, each of the threads accessing the sub-matrices from the partition memory, such that each node executes its corresponding instance of the computer software in an SMP mode;

storing the band matrix in band-matrix segments in the partition memory; and terminating the instances of the band reduction software;

in a second phase, reducing the band matrix to tridiagonal form by:

instantiating an instance of tridiagonal reduction software on one of the plurality of nodes, the tridiagonal reduction software employing a second number of user-specified second phase threads for executing second phase matrix operations on the band matrix;

creating a tridiagonal matrix by performing matrix operations on the band-matrix using the tridiagonal reduction software, each of the second phase threads accessing the band-matrix from the partition memory;

storing the tridiagonal matrix in the partition memory; and terminating the instances of tridiagonal reduction software;

in a third phase, computing eigenvectors and eigenvalues of the tridiagonal matrix by:

instantiating an instance of tridiagonal eigensolution software on a partition node, the tridiagonal eigensolution software employing a third number of user-specified third phase threads for executing third phase matrix operations on the tridiagonal matrix;

determining the eigenvectors and eigenvalues of the tridiagonal matrix by performing matrix operations on the tridiagonal matrix using the tridiagonal eigensolution software;

storing the eigenvectors and eigenvalues of the tridiagonal matrix in the partition memory; and terminating the instances of the tridiagonal eigensolution software;

determining the eigenpairs of the square matrix by in a fourth phase, transforming the eigenvectors of the tridiagonal matrix to eigenvectors of the band matrix by:

instantiating an instance of band backtransform software on one of the plurality of partition nodes, the band backtransform software employing a fourth number of user-specified fourth phase threads for executing fourth phase matrix operations on the eigenvectors and eigenvalues of the tridiagonal matrix;

transforming the eigenvectors of the tridiagonal matrix to eigenvectors of the band matrix by performing matrix operations on the eigenvectors of the tridiagonal matrix using the band backtransform software;

storing the eigenvectors of the band matrix in the partition memory; and terminating the instances of the band backtransform software;

in a fifth phase, transforming the eigenvectors of the band matrix to eigenvectors of the square matrix by:

instantiating an instance of dense backtransform software on one of the partition nodes, the dense backtransform software employing a fifth number of user-specified fifth phase threads for executing fifth phase matrix operations on the eigenvectors of the band matrix;

instantiating additional instances of the dense backtransform software on the partition nodes;

dedicating, within each of partition nodes, one of the plurality of cores to a corresponding one of the plurality of fifth phase threads;

transforming eigenvectors of the band matrix to eigenvectors of a square matrix by performing matrix operations on the eigenvectors of the band matrix using the dense backtransform software, each of the fifth phase threads accessing the eigenvectors of the band matrix from the partition memory, such that each node executes its corresponding instance of the dense backtransform software in an SMP mode;

storing the eigenvectors of the square matrix in the partition memory; and terminating the instances of the dense backtransform software.

* * * * *